United States Patent
Walma et al.

(10) Patent No.: US 9,900,858 B2
(45) Date of Patent: Feb. 20, 2018

(54) APPARATUS, SYSTEM AND METHOD OF ESTIMATING A LOCATION OF A MOBILE DEVICE

(71) Applicants: Mathys C. Walma, Hillsboro, OR (US); Richard D. Roberts, Hillsboro, OR (US); Carlos Cordeiro, Hillsboro, OR (US)

(72) Inventors: Mathys C. Walma, Hillsboro, OR (US); Richard D. Roberts, Hillsboro, OR (US); Carlos Cordeiro, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 585 days.

(21) Appl. No.: 14/129,301

(22) PCT Filed: May 30, 2013

(86) PCT No.: PCT/US2013/043213
§ 371 (c)(1),
(2) Date: Dec. 26, 2013

(87) PCT Pub. No.: WO2014/193372
PCT Pub. Date: Dec. 4, 2014

(65) Prior Publication Data
US 2014/0357292 A1    Dec. 4, 2014

(51) Int. Cl.
*H04W 64/00*    (2009.01)
*G01S 3/12*    (2006.01)
(Continued)

(52) U.S. Cl.
CPC .............. *H04W 64/00* (2013.01); *G01S 5/12* (2013.01); *G01S 13/765* (2013.01); *H04J 3/0667* (2013.01)

(58) Field of Classification Search
CPC ..... H04W 4/021; H04W 4/022; H04W 4/025; H04W 4/026; H04W 4/028; H04W 4/04;
(Continued)

(56) References Cited

U.S. PATENT DOCUMENTS 6,490,456 B1 * 12/2002 Bogdan ................ H04W 64/00
342/450
7,298,323 B2 * 11/2007 Park ..................... G01C 21/165
342/357.31
(Continued)

FOREIGN PATENT DOCUMENTS

EP    1860455    11/2007
WO    2009036202    3/2009

OTHER PUBLICATIONS

International Search Report and Written Opinion for PCT Patent Application No. PCT/US2013/043213, dated Feb. 26, 2014, 15 pages.
(Continued)

*Primary Examiner* — Olumide T Ajibade Akonai
(74) *Attorney, Agent, or Firm* — Shichrur & Co.

(57) ABSTRACT

Some demonstrative embodiments include devices, systems and/or methods of estimating a location of a mobile device. For example, an apparatus may include a controller to control a first wireless communication device to communicate a probe request with a second wireless communication device and to communicate a probe response with the second wireless communication device, wherein the probe response includes a delay value representing a delay period between a reception of the probe request and a transmission of a frame in response to the probe request.

19 Claims, 6 Drawing Sheets

(51) Int. Cl.
  *G01S 5/12* (2006.01)
  *H04J 3/06* (2006.01)
  *G01S 13/76* (2006.01)

(58) Field of Classification Search
  CPC ... H04W 64/00; H04W 64/003; H04W 4/008; H04W 48/16; H04W 48/14; H04W 8/005; G01S 5/14; G01S 13/878; G01S 13/765; G01S 7/4865; G01S 5/12; H04L 43/0864; H04L 2463/121; H04L 43/0852; H04J 3/0682; H04J 3/0667
  USPC ............ 455/404.2, 414.2–414.4, 440, 455/456.1–456.6, 457, 242.1
  See application file for complete search history.

(56) References Cited

U.S. PATENT DOCUMENTS

| | | | | |
|---|---|---|---|---|
| 2003/0031185 | A1* | 2/2003 | Kikuchi | H04L 43/0852 370/400 |
| 2006/0285527 | A1* | 12/2006 | Gao | H04W 52/0216 370/338 |
| 2007/0081508 | A1* | 4/2007 | Madhavan | H04L 63/0492 370/338 |
| 2007/0243888 | A1* | 10/2007 | Faccin | H04W 48/14 455/461 |
| 2008/0080387 | A1* | 4/2008 | Wang | H04L 12/2697 370/252 |
| 2009/0170554 | A1* | 7/2009 | Want | H04M 1/72502 455/552.1 |
| 2009/0232040 | A1* | 9/2009 | Abdel-Kader | G01D 7/08 370/311 |
| 2009/0318150 | A1* | 12/2009 | Kim | H04W 36/30 455/436 |
| 2010/0046388 | A1* | 2/2010 | Kim | H04W 64/00 370/252 |
| 2010/0151886 | A1* | 6/2010 | Swope et al. | 455/456.5 |
| 2011/0053613 | A1 | 3/2011 | Zhou et al. | |
| 2011/0134852 | A1* | 6/2011 | Cordeiro | H04W 8/18 370/329 |
| 2011/0143719 | A1* | 6/2011 | Jung | G07C 5/008 455/412.1 |
| 2011/0267124 | A1* | 11/2011 | Kim | H03K 5/1565 327/175 |
| 2012/0195296 | A1* | 8/2012 | Adachi | H04W 16/14 370/338 |
| 2013/0051293 | A1* | 2/2013 | Wentink | H04W 52/0216 370/311 |
| 2013/0084801 | A1* | 4/2013 | Royston | G06K 7/015 455/41.1 |
| 2013/0121173 | A1* | 5/2013 | Chen | H04W 24/08 370/252 |
| 2013/0188628 | A1* | 7/2013 | Lee | H04W 48/14 370/338 |
| 2013/0196598 | A1* | 8/2013 | McCormack | H01L 23/66 455/41.1 |
| 2014/0003282 | A1* | 1/2014 | Kafle | H04W 48/14 370/254 |
| 2014/0004877 | A1* | 1/2014 | Van Diggelen | G01S 5/12 455/456.1 |
| 2014/0120955 | A1* | 5/2014 | Padden | H04W 36/00 455/456.6 |
| 2014/0141826 | A1* | 5/2014 | Cordeiro | 455/509 |
| 2014/0198692 | A1* | 7/2014 | Torab Jahromi | H04W 74/04 370/310 |

OTHER PUBLICATIONS

Wireless Gigabit Alliance (WGA) Specifications; WiGig MAC and PHY Specification Version 1.1, Apr. 2011—Final Specification; 442 pages.
IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.
Wi-Fi Alliance Technical Committee P2P Task Group; Wi-Fi Peer-to-Peer (P2P) Technical Specification; Version 1.2; Dec. 14, 2011; 160 pages.
IEEE Std 802.15.3c™-2009. IEEE Standard for Information technology—Telecommunications and information exchange between systems Local and metropolitan area networks—Specific requirements Part 15.3: Wireless Medium Access Control (MAC) and Physical Layer (PHY) Specifications for High Rate Wireless Personal Area Networks (WPANs), Oct. 12, 2009.
Open Mobile Alliance, Secure User Plane Location Architecture, OMA-AD-SUPL-V2_0-20120417-A, Version 2.0, Apr. 17, 2012, 51 pages.
Open Mobile Alliance, Mobile Location Protocol 3.3, OMA-TS-MLP-V3_3-20110719-A, Version 3.3, Jul. 19, 2011, 137 pages.
W3C, Geolocation API Specification, W3C Proposed Recommendation May 10, 2012, 18 pages.
International Preliminary Report on Patentability for International Patent Application No. PCT/US2013/043213, dated Dec. 10, 2015, 10 pages.

* cited by examiner

APPARATUS, SYSTEM AND METHOD OF ESTIMATING A LOCATION OF A MOBILE DEVICE

CROSS REFERENCE

This application is a National Phase Application of PCT International Application No. PCT/US2013/043213, International Filing Date May 30, 2013, the entire disclosure of which is incorporated herein by reference.

TECHNICAL FIELD

Embodiments described herein generally relate to estimating a location of a mobile device.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem. This problem does not yet have a scalable solution with satisfactory precision.

One solution for indoor navigation includes a Time-of-Flight (ToF) measurement method. The ToF may be defined as the overall time a signal propagates from a first station, e.g., a user ("client") mobile device, to a second station, e.g., an access point (AP), and back to the first station. A distance between the first and second stations may be calculated based on the ToF value.

An estimated location of the first station may be determined by calculating two or more distances between the first station and two or more other stations, e.g., other APs, by utilizing a suitable method, e.g., a trilateration method.

The location calculation method may not provide a location estimation with a desired accuracy, for example, if the one or more distances do not have a desired accuracy.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
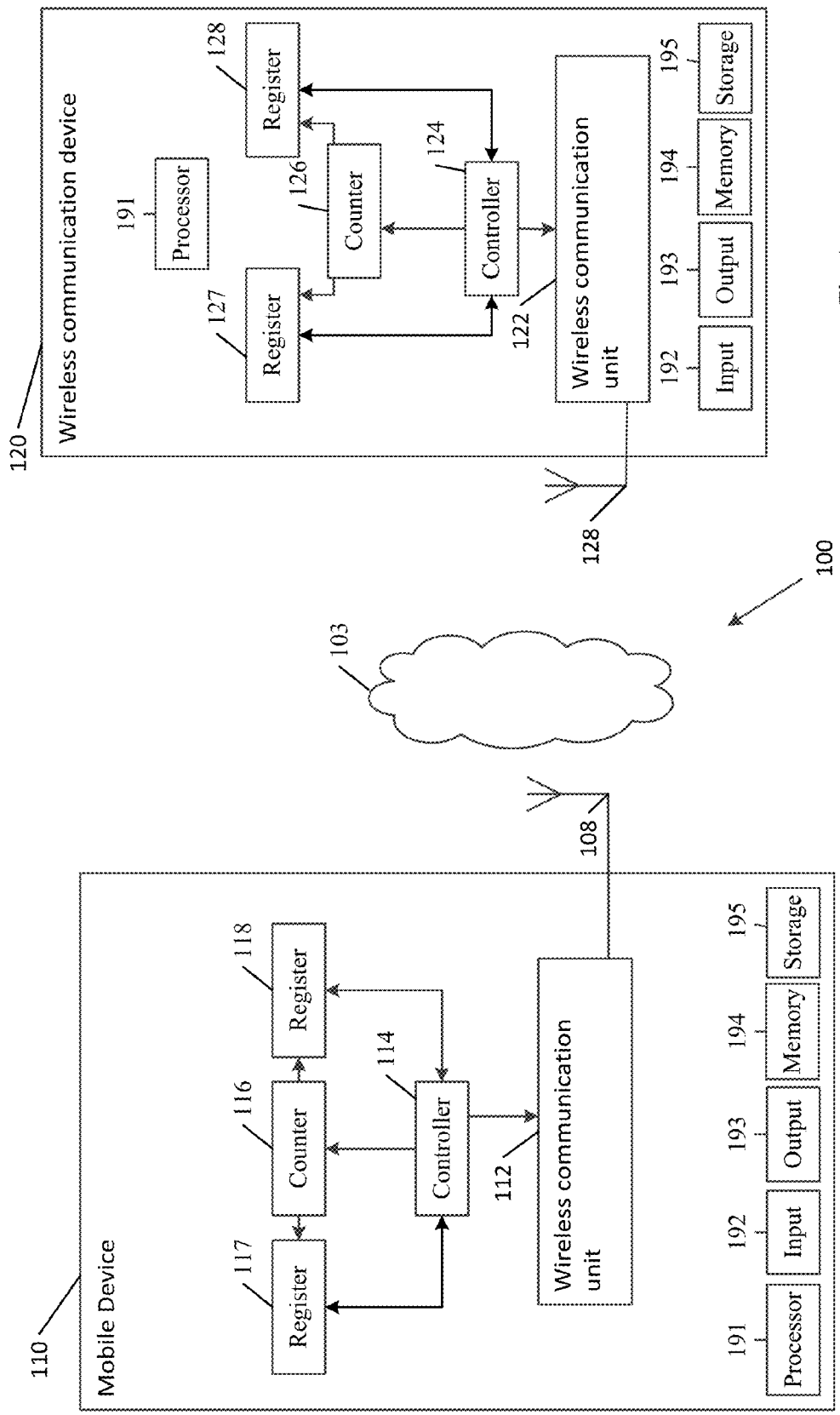
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Stan-* dard for Information technology—Telecommunications and information exchange between systems Local and metropolitan area networks—Specific requirements Part 11: Wireless LAN Medium Access Control (MAC) and Physical Layer (PHY) Specifications, Mar. 29, 2102; IEEE802.11 task group ac (TGac) ("*IEEE802.11-09/0308r12—TGac Channel Model Addendum Document*"); IEEE 802.11 task group ad (TGad) (*IEEE P802.11ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*); IEEE 802.11-REVmc (*IEEE P802.11-REVmc/D1.2—Telecommunications and information exchange between systems, Local and metropolitan area networks—Specific requirements, Part 11: Wireless LAN Medium Access Control (MAC) and Physical Layer (PHY) Specifications, April* 2013)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.3, 2012) and/or future versions and/or derivatives thereof, devices and/or networks operating in accordance with existing cellular specifications and/or protocols, e.g., 3$^{rd}$ Generation Partnership Project (3GPP), 3GPP Long Term Evolution (LTE), and/or future versions and/or derivatives thereof, devices and/or networks operating in accordance with existing Open Mobile Alliance (OMA) standards, including the Secure User Plane Location (SUPL) protocol (*SUPL-OMA-AD-SUPL-V*2.0 5.3.1.8), the Mobile Location Protocol (MLP) (*OMA-TS-MLP v* 3.3, *March* 2009) and/or future versions and/or derivatives thereof, devices and/or networks operating in accordance with existing In Location Alliance protocols and/or standards and/or future versions and/or derivatives thereof, devices and/or networks operating in accordance with existing World-Wide-Web Consortium (W3C) standards, including the *W3C Hypertext Markup Language (HTML) Version* 5, October 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The phrase "docking station", as used herein, may relate to an interface connected to one or more peripheral devices, e.g., a display, one or more speakers, a mouse, a keyboard and/or the like, configured to enable a device to connect to and communicate with the peripheral devices. For example, the docking station may be configured to enable a mobile device, e.g., a mobile computer, to connect to an external display and/or an external keyboard.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The term "beamforming", as used herein, may relate to a spatial filtering mechanism, which may be used at a transmitter and/or a receiver to improve the received signal power or signal-to-noise ratio (SNR) at an intended receiver.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless communication medium (WM) 103. For example, system 100 may include a mobile device 110 and a wireless communication device 120. Wireless communication medium 103 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, system 100 may include one or more client STAs, and one or more APs. For example, device 110 may perform the functionality of a client STA, and device 120 may perform the functionality of an AP, e.g., a WiFi AP, a router, and the like.

In some demonstrative embodiments, device 110 and/or device 120 may perform the functionality of mmWave STAs, e.g., DMG stations ("DMG STA"). For example, device 110 and/or device 120 may be configured to communicate over the DMG band.

In some demonstrative embodiments, device 120 may include a mobile or a non-mobile device, e.g., a static device.

In some demonstrative embodiments, device 120 may perform the functionality of a wireless docking station, configured to enable mobile device 110 to connect to, e.g., in a wireless manner, one or more peripheral devices, e.g., a keyboard, a display, a mouse and/or the like.

In some demonstrative embodiments, mobile device 110 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile phone, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a video device, an audio device, an A/V device, a gaming device, a media player, a Smartphone, or the like.

In some demonstrative embodiments, wireless communication medium 103 may include a direct link, e.g., a P2P link, for example, to enable direct communication between device 110 and device 120.

In some demonstrative embodiments, wireless communication medium 103 may include a wireless communication link over the mmWave band, e.g., the DMG band.

In some demonstrative embodiments, wireless communication medium 103 may include a wireless beamformed link.

In some demonstrative embodiments, wireless communication medium 103 may include a wireless gigabit (WiGig) link. For example, wireless communication medium 103 may include a wireless beamformed link over the 60 GHZ frequency band.

In other embodiments, wireless communication medium 103 may include any other suitable link and/or may utilize any other suitable wireless communication technology.

In some demonstrative embodiments, device 110 and/or device 120 may include wireless communication units, to perform wireless communication between device 110 and device 120 over wireless communication medium 103. For example, device 110 may include a wireless communication unit 112, and/or device 120 may include a wireless communication unit 122.

In some demonstrative embodiments, wireless communication units 112 and/or 114 may include one or more radios, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, filters, and/or the like. For example, wireless communication units 112 and/or 114 may include or may be implemented as part of a wireless Network Interface Card (NIC), and the like.

In some demonstrative embodiments, the wireless communication units may include, or may be associated with, one or more antennas. For example, wireless communicate unit 112 may be associated with one or more antennas 108 and wireless communicate unit 122 may be associated with one or more antennas 128.

Antennas 108 and/or 128 may include any type of antennas suitable for transmitting and/or receiving wireless communication signals, blocks, frames, transmission streams, packets, messages and/or data. For example, antennas 108 and/or 128 may include any suitable configuration, structure and/or arrangement of one or more antenna elements, components, units, assemblies and/or arrays. Antennas 108 and/or 128 may include, for example, antennas suitable for directional communication, e.g., using beamforming techniques. For example, antennas 108 and/or 128 may include a phased array antenna, a multiple element antenna, a set of switched beam antennas, and/or the like. In some embodiments, antennas 108 and/or 128 may implement transmit and receive functionalities using separate transmit and receive antenna elements. In some embodiments, antennas 108 and/or 128 may implement transmit and receive functionalities using common and/or integrated transmit/receive elements.

In some demonstrative embodiments, mobile device 110 and/or device 120 may also include, for example, one or more of a processor 191, an input unit 192, an output unit 193, a memory unit 194, and a storage unit 195. Mobile device 110 and/or device 120 may optionally include other suitable hardware components and/or software components. In some demonstrative embodiments, some or all of the components of mobile device 110 and/or device 120 may be enclosed in a common housing or packaging, and may be interconnected or operably associated using one or more wired or wireless links. In other embodiments, components of mobile device 110 and/or device 120 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 111 executes instructions, for example, of an Operating System (OS) of mobile device 110, device 120 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 110 and/or device 120.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, mobile device 110 may estimate one or more parameters relating to a location of mobile device 110 based on a Time of Flight (ToF) measurement.

The ToF may be defined as the overall time ("round trip time") a signal propagates from a first station, e.g., device 110, to a second station, e.g., device 120, and back to the first station. A distance between the first and second stations may be determined based on the ToF value, for example, by dividing the ToF value by two and multiplying the result by the speed of light.

In some demonstrative embodiments, device 110 may determine a distance of device 110 with respect to a wireless communication device, e.g., device 120, based on the ToF measurement.

In some demonstrative embodiments, device 110 may determine an estimated location of device 110, by calculating additional distances, e.g., two or more distances, between device 110 and two or more other stations, for example, by utilizing trilateration techniques.

In one example, device 110 may perform a ToF measurement with device 120 to determine a distance between device 110 and device 120.

In some demonstrative embodiments, the ToF measurement performed between device 110 and device 120 may result in a non-accurate or an erroneous location, for example, if the ToF measurement is not accurate.

In some demonstrative embodiments, the overall time the signal propagates from the first station to the second station and back to the first station may include a delay period between receiving the signal from the first station at the second station and transmitting the signal from the second station to the first station. The delay period may be introduced by the second station, for example, due to hardware processing and/or any other processing of the signal at the second station.

Figure 2:
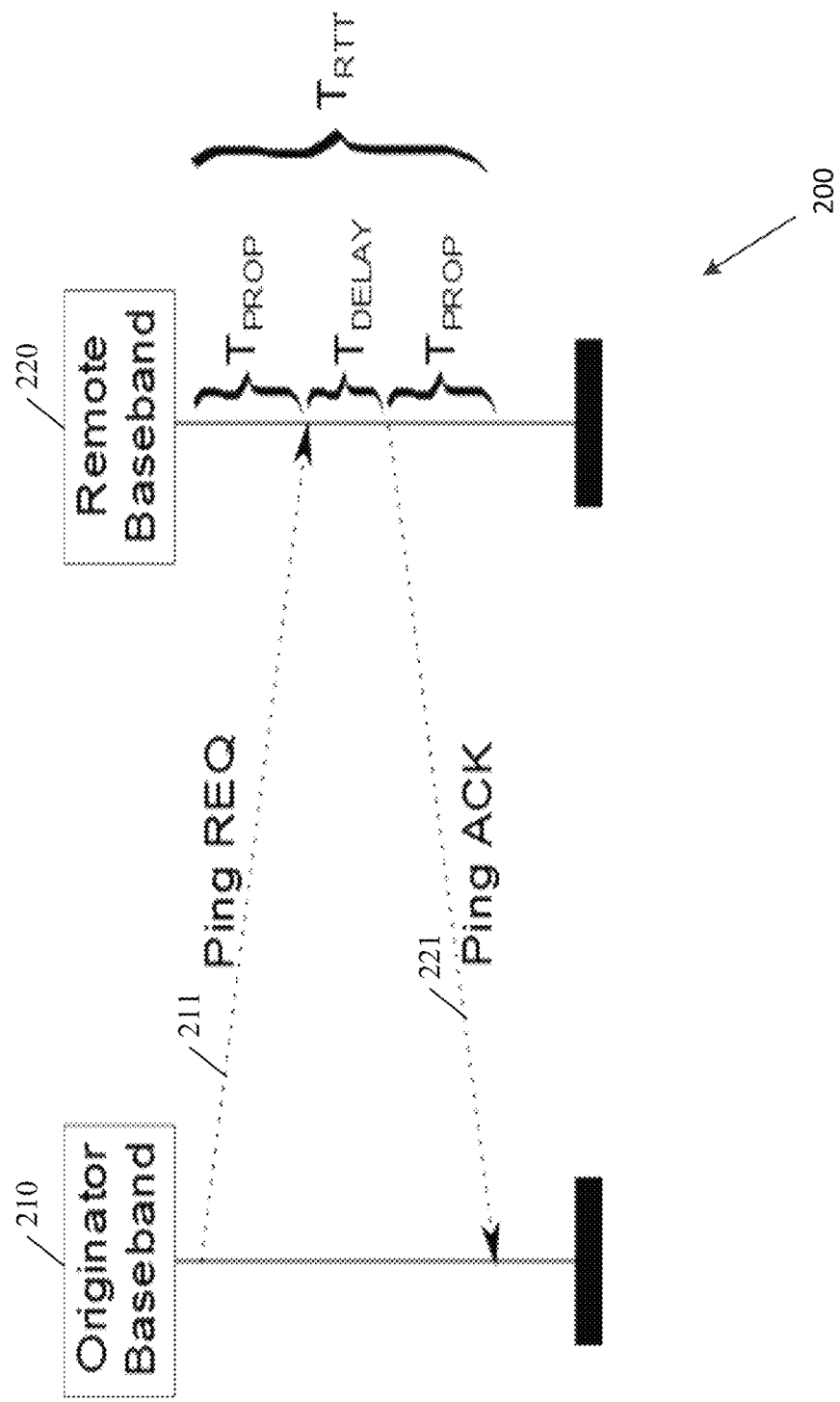
FIG. 2 is a schematic sequence diagram illustration of operations between a mobile device and a wireless communication device, in accordance with some demonstrative embodiments.

Reference is made to FIG. 2, which is a schematic sequence diagram illustration 200 of operations between a first device 210 (Originator Baseband) and a second device 220 (Remote Baseband), in accordance with some demonstrative embodiments. For example, device 210 may perform the functionality of device 110 (FIG. 1) and/or device 220 may perform the functionality of device 120 (FIG. 1).

In some demonstrative embodiments, one or more operations of diagram 200 may be utilized, for example, for performing a ToF measurement between device 210 and device 220, e.g., to determine a distance between device 210 and device 220.

As shown in FIG. 2, device 210 may transmit to device 220 a message 211, and device 220 may transmit a message 221 to device 210, e.g., in response to message 211.

In some demonstrative embodiments, message 211 and/or message 221 may include a ping message. For example, message 211 may include a ping request (Ping REQ) message, and message 221 may include a ping acknowledge (Ping Ack) message. In other embodiments, messages 211 and/or 221 may include any other suitable messages.

As shown in FIG. 2, a round trip time, denoted $T_{RTT}$, from device 210 to device 220 and back to device 210, may be based on a propagation time between device 210 and device 220, denoted $T_{PROP}$, and a delay period, denoted $T_{DELAY}$.

As shown in FIG. 2, the delay period $T_{DELAY}$ may include a time period between receiving message 211 at device 220 and transmitting message 221 by device 220.

In some demonstrative embodiments, the round trip time $T_{RTT}$ may be expressed as follows, e.g., assuming the signal travels from device 211 to device 220 and back to device 210 via the same path and at the same time:

$$T_{RTT} = 2 * T_{PROP} + T_{DELAY} \qquad (1)$$

In some demonstrative embodiments, device 210 may determine the propagation time $T_{PROP}$ based on the round trip time $T_{RTT}$, e.g., according to Equation 1.

In some demonstrative embodiments, device 210 may determine a distance between device 210 and device 220 by multiplying the propagation time $T_{PROP}$ by the speed of light.

In some demonstrative embodiments, device 210 may not be able to determine a relatively accurate distance if the delay period $T_{DELAY}$ is not known to device 210, and/or if the delay period $T_{DELAY}$ is not known at a required accuracy level.

Referring back to FIG. 1, the ToF measurement performed between device 110 and device 120 may not be accurate, for example, if device 110 does not know the delay period $T_{DELAY}$ introduced by device 120 between receiving the signal from device 110 and transmitting the signal from device 120 to device 110.

For example, an estimated distance between device 110 and device 120 may be greater than the accurate distance between device 110 and device 120, e.g., by at least one meter, for example, if the overall time of propagation between device 110 and device 120 and back to device 110 includes a relatively increased delay period $T_{DELAY}$.

In some demonstrative embodiments, the delay period $T_{DELAY}$ may be predefined, e.g., by any suitable Protocols or Specifications.

In some demonstrative embodiments, the delay period $T_{DELAY}$ may be defined based on one or more attributes of device 120, e.g., hardware attributes, processing attributes and/or the like.

In some demonstrative embodiments, the delay period $T_{DELAY}$ may be defined to include a relatively decreased period of time, for example, to improve an accuracy of the estimation of the distance. For example, decreasing the delay period $T_{DELAY}$ may decrease a drifting between clocks of device 110 and device 120.

In some demonstrative embodiments, device 120 may transmit to device 110 information ("delay information") relating to the delay period $T_{DELAY}$ of device 120.

In some demonstrative embodiments, device 110 may estimate the distance between device 110 and device 120 based on the delay information, e.g., as described below.

In some demonstrative embodiments, device 120 may transmit the delay information as part of a communication between device 120 and device 110 for establishing wireless communication link 103 between device 110 and device 120, e.g., as described below.

In other embodiments, device 120 may transmit the delay information to device 110 as part of any other predefined procedure and/or any other dedicated messages.

In some demonstrative embodiments, the delay information may include a delay value representing the delay period $T_{DELAY}$.

In some demonstrative embodiments, the delay value may include a value in time units, e.g., milliseconds, microseconds, nanoseconds and the like, and/or a value representing time, e.g., counts and/or increments of a counter and/or the like.

In some demonstrative embodiments, wireless communication units 112 and 122 may communicate a probe request and a probe response in response to the probe request.

In some demonstrative embodiments, the probe response may include the delay value representing the delay period $T_{DELAY}$ between receiving the probe request and transmitting a frame in response to the probe request, e.g., as described below.

In some demonstrative embodiments, device 110 may establish a wireless communication link with device 120 over wireless communication medium 103. In one example, device 110 may establish with device 120 a wireless beamformed link over the mmWave frequency band. In another example, device 110 may establish with device 120 any other suitable wireless link over wireless communication medium 103.

In some demonstrative embodiments, wireless communication unit 112 may transmit the probe request to device 120 as part of the establishment of the wireless communication link over wireless communication medium 103.

In some demonstrative embodiments, the probe request may include a unicast probe request.

In some demonstrative embodiments, the frame may include an acknowledge (Ack) frame configured to acknowledge receipt of the unicast probe request.

In some demonstrative embodiments, the frame may include any other frame transmitted in response to the probe request.

In some demonstrative embodiments, device 110 may include a controller 114 configured to control wireless communication unit 112 to transmit the probe request to device 120, and to receive the frame and/or the probe response from device 120.

In some demonstrative embodiments, device 120 may include a controller 124 configured to control wireless communication unit 122 to receive the probe request from device 110, and to transmit the frame and/or the probe response to device 110 in response to the probe request.

In some demonstrative embodiments, controller 114 may estimate a distance between device 110 and mode 120 based on the frame, e.g., as described below.

In some demonstrative embodiments, controller 114 may estimate a distance between device 110 and mode 120 based on the probe response, e.g., as described below.

In some demonstrative embodiments, controller 114 may estimate the distance between device 110 and mode 120 based on the delay value included in the probe response, e.g., as described below.

In some demonstrative embodiments, controller 124 may control wireless communication unit 122 to transmit the frame to device 110 after the delay period $T_{DELAY}$ from receiving the probe request from device 110, e.g., as described below.

In some demonstrative embodiments, device 120 may include a counter 126 configured to be incremented at a symbol rate of device 120. For example, a baseband sample rate of device 120 may be a rational multiplier of 2640 mega samples per second (Msps). Accordingly, counter 126 may be incremented at a rate of 2640 Mega (M) times per second, e.g., assuming counter 126 utilizes the sample rate of 2640 Msps. In another example, counter 126 may be incremented at a greater rate, e.g., if the baseband sample rate is greater, for example, a sample rate of 5280 Msps.

In some demonstrative embodiments, device 120 may include a register 127 configured to store a first value of counter 126.

In some demonstrative embodiments, controller 124 may control register 127 to capture and store the first value of counter 126, for example, when wireless communication unit 122 receives the probe request.

In some demonstrative embodiments, device 120 may include a register 128 configured to store a second value of counter 126.

In some demonstrative embodiments, controller 124 may control wireless communication unit 122 to transmit the frame when a difference between the first value of register 127 and the second value of register 128 corresponds to the delay period $T_{DELAY}$.

For example, the delay period $T_{DELAY}$ may include a time period of one millisecond. Accordingly, controller 124 may control wireless communication unit 122 to transmit the frame when the difference between the second value and the first value is 2640 kilo-samples, e.g., assuming the sample rate of 2640 Msps.

In some demonstrative embodiments, the delay value may include the time period of the delay period $T_{DELAY}$, and/or counts and/or increments of counter 126, e.g., a difference between the first value of register 127 and the second value of register 128.

In some demonstrative embodiments, wireless communication unit 112 may receive the probe response including the delay value transmitted from device 120, and may determine a distance between device 120 and device 110 based on the probe response, e.g., as described below.

In some demonstrative embodiments, controller 114 may determine the distance between device 110 and device 120 based on the ToF between device 120 and device 110, for example, based on the round trip time $T_{RTT}$ and the delay value $T_{DELAY}$, e.g., according to Equation 1.

In some demonstrative embodiments, controller 114 may be configured to determine a time of departure of the probe request and a time of arrival of the frame.

In some demonstrative embodiments, controller 114 may determine the round trip time $T_{RTT}$ based on the difference between the time of arrival the frame at device 110 and the time of departure of the probe request from device 110.

In some demonstrative embodiments, device 110 may include a counter 116 configured to be incremented at a symbol rate of device 110. For example, a baseband sample rate of device 110 may be a rational multiplier of 2640 Msps. Accordingly, counter 110 may be incremented at a rate of 2640M times per second, e.g., assuming counter 116 utilizes the smallest sample rate.

In some demonstrative embodiments, device 110 may include a register 117 configured to store a first value of counter 116.

In some demonstrative embodiments, controller 114 may control register 117 to capture and store the first value of counter 116, for example, when wireless communication unit 112 transmits the probe request, e.g., to capture the time of departure of the probe request.

In some demonstrative embodiments, device 110 may include a register 118 to store a second value of counter 116.

In some demonstrative embodiments, controller 114 may control register 118 to capture the second value of counter 116, for example, when wireless communication unit 112 receives the frame from device 120, e.g., to capture the time of arrival of the frame.

In some demonstrative embodiments, controller 114 may determine the round trip time $T_{RTT}$ based on a difference between the second value stored in register 118 and the first value stored in register 117.

For example, the round trip time $T_{RTT}$ between device 110 and device 120 may be equal to 10 milliseconds, for example, if the difference between the second value of register 118 and the first value of register 117 is 26400 kilo samples, e.g., assuming a sample rate of 2640 Msps at device 110.

In some demonstrative embodiments, controller 114 may be able to determine the distance between device 120 and device 110, for example, based on the round trip time $T_{RTT}$, and the delay value corresponding to device 120.

In some demonstrative embodiments, controller 114 may determine the distance between device 120 and device 110 by determining the value of the propagation time $T_{PROP}$ according to Equation 1, e.g., since the round trip time $T_{RTT}$ and the delay period $T_{DELAY}$ are known.

In some demonstrative embodiments, controller 114 may determine the distance between device 120 and device 110 by multiplying the value of the propagation time $T_{PROP}$ by the speed of light.

In some demonstrative embodiments, controller 114 may determine the distance between device 120 and device 110 at an accuracy level, which is based on the sampling rate of device 110.

For example, a distance, which a signal communicated between device 110 and 120 may travel during an increment counting unit of counter 116, may be determined by dividing the speed of light, e.g., 300E6, by the sampling rate of device 110, e.g., 2640E6. Accordingly, the signal may travel a distance of 0.113 meter or 11.3 centimeters (cm) every increment of counter 116, e.g., if device 110 operates at a sample rate of 2640 Msps.

Accordingly, device 110 may have an accuracy level, which is not better than 11.3 cm. For example, device 110 may determine distances at a resolution equal to or higher than 11.3 cm.

In some demonstrative embodiments, controller 114 may determine the estimated distance between devices 110 and 120 by performing a plurality of measurements of the round trip time $T_{RTT}$, determining a plurality of distances based on the plurality of measurements, and averaging the distances.

In some demonstrative embodiments, frequency offset of clocks of devices 110 and/or 120 may introduce a variation in the estimated distance between device 110 and device 120.

In some demonstrative embodiments, the variation in the estimated distance may have a histogram having a Gaussian shape, and the average of the histogram may be the actual distance between device 110 and device 120.

In some demonstrative embodiments, the sample mean variance of the histogram may be decreased by 1/N, wherein N denotes a number of measurements. For example, if the round trip time $T_{RTT}$ has a mean of 10,000 samples and a variance of 1 sample, then the variance of averaging over ten measurements may give a variance of 1/10th of a sample. Accordingly, controller 114 may determine the distance between device 110 and device 120 by averaging over ten measurements, which may improve an accuracy of the estimated distance between device 110 and 120.

In some demonstrative embodiments, controller 114 may estimate a location of device 110 based on a direction (RX directionality) from which the frame is received at device 110.

In one example, a vector including the RX directionality and the distance between device 110 and 120 may enable estimating the location of device 110 at a relatively increased accuracy.

In some demonstrative embodiments, controller 114 may determine the direction based on a direction of steering of antennas 108. For example, controller 114 may utilize angle of arrival information, e.g., when performing beamforming between antennas 108 and 128. In other embodiments, controller 114 may determine the direction based on any other suitable method.

In some demonstrative embodiments, controller 114 may estimate a location of device 110 based on the azimuth of the direction and the location of device 120, e.g., since device 120 is static, and the distance to device 120, e.g., as determined by controller 114, for example, using an azimuth range method.

In one example, controller 114 may determine that the frame is received via a direction having an azimuth of 70 degrees, and the distance to device 120 is one meter. Accordingly, controller 114 may estimate the location of device 110 to be one meter at an azimuth of 250 degrees from the location of device 120.

In some demonstrative embodiments, device 110 may determine the delay period of device 120, for example, without receiving delay information from device 120, e.g., without receiving the delay value included in the probe request.

In some demonstrative embodiments, device 110 may utilize a plurality of messages, e.g., probe requests and acknowledge frames, to determine the delay period of device 120, e.g., as described below.

In some demonstrative embodiments, controller 114 may be able to determine the distance between device 110 and device 120, for example, after determining the delay period of device 120, e.g., as described above.

In some demonstrative embodiments, controller 114 may control wireless communication unit 112 to communicate a plurality of message sequences with device 120.

In some demonstrative embodiments, a message sequence of the plurality of message sequences may include a first message transmitted from wireless communication unit 112 to device 120 and a second message transmitted from wireless communication unit 122 to device 110, in response to the first message.

In some demonstrative embodiments, controller 114 may determine delay time based on the plurality of message sequences.

In some demonstrative embodiments, the delay time may correspond to a delay period between receiving the first message by device 120 and transmitting the second message by device 120.

In some demonstrative embodiments, the first message may include a probe request and the second message may include a frame to acknowledge receipt of the probe request.

In some demonstrative embodiments, the probe request may include a unicast probe request, and the frame may include an acknowledge (Ack) frame to acknowledge receipt of the unicast probe request.

In other embodiments, the frame may include any other frame, e.g., a probe response or the like.

In some demonstrative embodiments, controller 114 may be able to determine the delay time when device 110 is static. In other embodiments, controller 114 may be able to determine the delay time when device 110 is moving.

In some demonstrative embodiments, controller 114 may control wireless communication unit 112 to communicate a first message sequence and a second message sequence, e.g., when device 110 is static.

In some demonstrative embodiments, a first time period between receiving a first message of the first message sequence and transmitting a second message of the first message sequence by device 120 may be different than a second time period between receiving a first message of the second message sequence and transmitting a second message of the second sequence by device 120.

In some demonstrative embodiments, the second time period may be a multiple of the first time period. For example, the second time period may be double the first time period. In one example, the first time period may include a time period of two milliseconds and the second time period may include a time period of four milliseconds.

In one example, controller 124 may control wireless communication unit 122 to transmit the second message of the first message sequence after the first time period from receiving the first message of the first message sequence, and to transmit the second message of the second message sequence after the second time period, e.g., double than the first time period, from receiving the first message of the second message sequence. For example, controller 124 may control wireless communication unit 122 to transmit the second message of the first and second sequences by controlling counter 126, register 127 and register 128, e.g., as described above.

In some demonstrative embodiments, wireless communication unit 112 may receive the second message of the first message sequence and the second message of the second message sequence.

In some demonstrative embodiments, controller 114 may determine the delay time of device 120 based on the first and second message sequences.

In some demonstrative embodiments, controller 114 may determine the distance between device 120 and device 110 based on the first and second message sequences.

In some demonstrative embodiments, controller 114 may determine a round trip time of the first message sequence, denoted $T_{RTT1}$, and a round trip time of the second message sequence, denoted $T_{RTT2}$, e.g., based on the values of registers 117 and 118, as described above.

In some demonstrative embodiments, the round trip time $T_{RTT1}$ may include the first time period, and the round trip time $T_{RTT2}$ may include the second time period.

In some demonstrative embodiments, the round trip times $T_{RTT1}$ and $T_{RTT2}$ may be expressed, e.g., as follows:

$$T_{RTT1}=2*T_{PROP}+T_{DELAY} \quad (2)$$

$$T_{RTT2}=2*T_{PROP}+2*T_{DELAY} \quad (3)$$

In some demonstrative embodiments, Equations 2 and 3 may form a nonsingular matrix, which may be solved to determine a value of the time delay $T_{DELAY}$, and the propagation time $T_{PROP}$, e.g., as follows:

$$T_{PROP}=T_{RTT1}-\tfrac{1}{2}*T_{RTT2} \quad (4)$$

$$T_{DELAY}=-T_{RTT1}+T_{RTT2} \quad (5)$$

In some demonstrative embodiments, controller 114 may estimate the distance between device 120 and device 110 by multiplying the value of $T_{PROP}$ by the speed of light.

In some demonstrative embodiments, device 110 may be moving between a plurality of locations.

In some demonstrative embodiments, controller 114 may control wireless communication unit 112 to communicate three message sequences, e.g., when device 110 is moving.

In some demonstrative embodiments, controller 124 may control wireless communication unit 122 to transmit the second message of the first message sequence a first time period after receiving the first message of the first message sequence, to transmit the second message of the second message sequence a second time period after receiving the first message of the second message sequence, and to transmit the second message of the third message sequence a third time period after receiving the first message of the second message sequence. For example, controller 124 may control wireless communication unit 122 to transmit the second message of the first, second and third sequences by controlling counter 126, register 127 and register 128, e.g., as described above.

In some demonstrative embodiments, the first time period may be different from the second time period, and the second time period may be different from the third time period.

In some demonstrative embodiments, the third time period may be a multiple of the second time period, and the second time period may be a multiple of the first time period. For example, the third time period may be double the second time period, and the second time period may be double the first time period. In one example, the first time period may include a time period of two milliseconds, the second time period may include a time period of four milliseconds and the third time period may include a time period of eight milliseconds.

In some demonstrative embodiments, the first time period may include the delay time $T_{DELAY}$ of device 120.

In some demonstrative embodiments, wireless communication unit 112 may receive the second message of the first message sequence, the second message of the second message sequence and the second message of the third message sequence.

In some demonstrative embodiments, controller 114 may determine the delay time of device 120 based on the three message sequences.

In some demonstrative embodiments, controller 114 may determine the distance between device 120 and device 110 based on the three message sequences.

In some demonstrative embodiments, controller 114 may determine a round trip time of the first message sequence, denoted $T_{RTT1}$, a round trip time of the second message sequence, denoted $T_{RTT2}$, and a round trip time of the third message sequence, denoted $T_{RTT3}$, e.g., based on the values of registers 117 and 118, as described above.

In some demonstrative embodiments, controller 114 may control wireless communication unit 112 to communicate the three message sequences at regular intervals, e.g., at a time interval, denoted $\Delta t$. For example, a first time interval, e.g., between transmitting the first message of the first message sequence and transmitting the first message of the second message sequence, and a second time interval, e.g., between transmitting the first message of the second message sequence and transmitting the first message of the third message sequence, may each be equal to the time interval $\Delta t$.

In some demonstrative embodiments, the round trip time $T_{RTT1}$ may be expressed, e.g., as follows:

$$T_{RTT1} = 2*\left(\frac{d}{c}\right) + T_{DELAY} \tag{6}$$

wherein d denotes an initial distance in meters between device 110 and device 120 when transmitting the first message of the first message sequence, and c denotes the speed of light.

In some demonstrative embodiments, the round trip time $T_{RTT2}$ of the second message sequence may be expressed, e.g., as follows:

$$T_{RTT2} = 2*\left(\frac{d + v \cdot \Delta t}{c}\right) + 2*T_{DELAY} \tag{7}$$

wherein v denotes the relative velocity of device 110 with respect to device 120.

In some demonstrative embodiments, the relative velocity v may be positive, e.g., if device 110 is moving away from device 120, or negative, e.g., if device 110 is moving towards device 120.

In some demonstrative embodiments, the round trip time $T_{RTT3}$ may be expressed, e.g., as follows:

$$T_{RTT3} = 2*\left(\frac{d + 2 \cdot v \cdot \Delta t}{c}\right) + 4*T_{DELAY} \tag{8}$$

In some demonstrative embodiments, the relative velocity v may be assumed to be constant during the three message sequences, for example, assuming the time interval $\Delta t$ is relatively short.

In some demonstrative embodiments, Equations 6, 7 and 8 may form an invertible matrix, e.g., having three variables, which may be solved to determine a value of the time delay $T_{DELAY}$, the value of the distance d between device 110 and device 120, and the value of the relative speed v, e.g., as follows:

$$d = c\left(T_{RTT2} - \frac{1}{2} \cdot T_{RTT3}\right) \tag{9}$$

$$v = \frac{c}{\Delta t}\left(-T_{RTT1} + \frac{3}{2} \cdot T_{RTT2} - \frac{1}{2} \cdot T_{RTT3}\right) \tag{10}$$

$$T_{DELAY} = T_{RTT1} - 2 \cdot T_{RTT2} + T_{RTT3} \tag{11}$$

In some demonstrative embodiments, solving Equations 6, 7 and 8 may enable controller 114 to determine the distance d between device 110 and device 120, for example, when device 110 is moving and the delay time of device 120 is not known to device 110.

Figure 3:
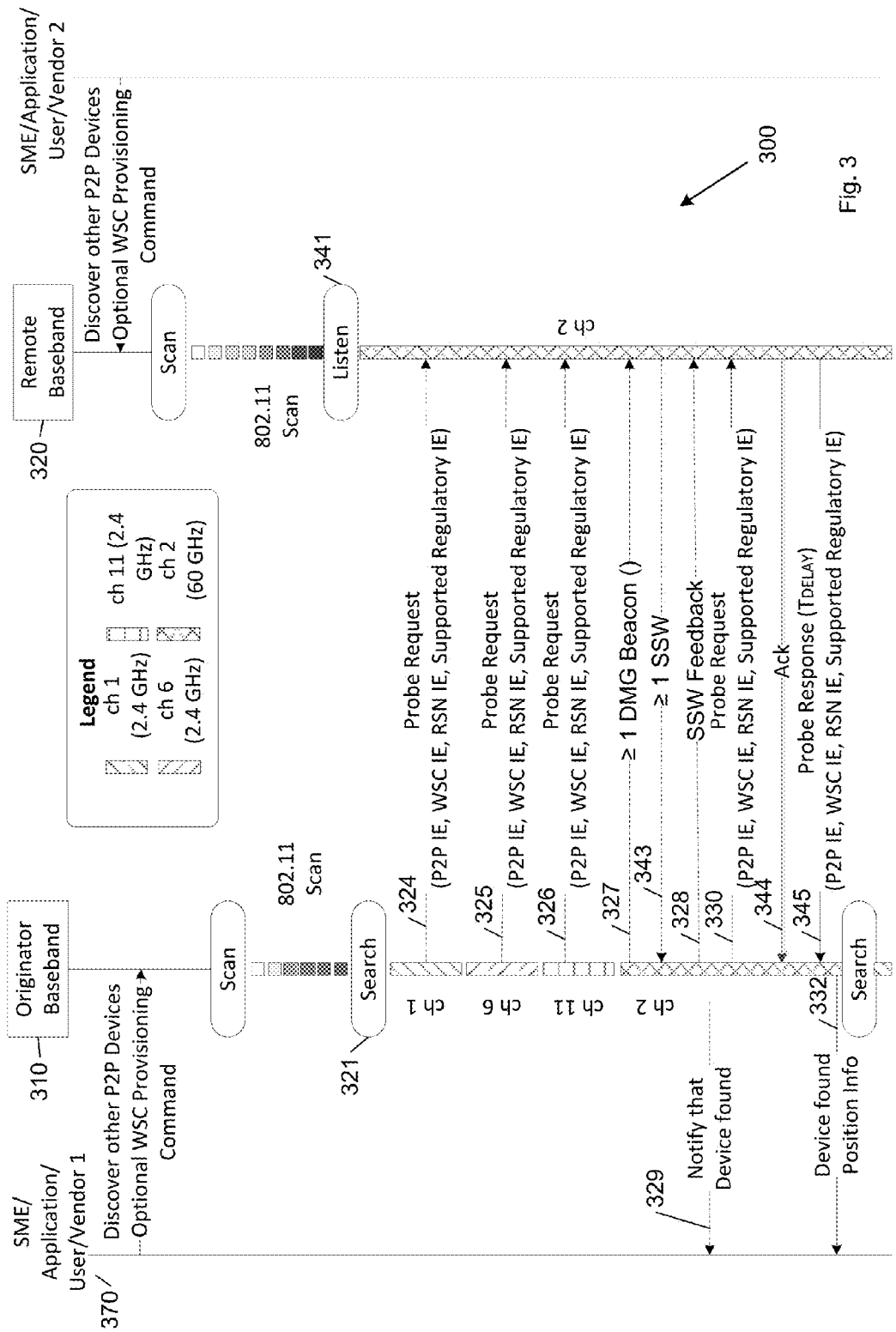
FIG. 3 is a schematic sequence diagram illustration of operations and interactions between a mobile device and a wireless communication device during a discovery process, in accordance with some demonstrative embodiments.

Reference is now made to FIG. 3, which schematically illustrates a sequence diagram 300 of operations and interactions between a mobile device 310 ("Originator Baseband"), and a wireless communication device 320 ("Remote Baseband"), in accordance with some demonstrative embodiments. For example, mobile device 310 may perform the functionality of mobile device 110 (FIG. 1) and device 320 may perform the functionality of device 120 (FIG. 1).

In some demonstrative embodiments, sequence diagram 300 may be utilized to determine a distance between device 310 and device 320, for example, when establishing a link between device 320 and device 310.

As shown in FIG. 3, device 310 may perform a search (321) over four predefined channels. For example, device 310 may perform the search over three social channels defined for the non-DBand, e.g., 2.4 GHz, and over a single social channel defined for the DBand, e.g., 60 GHZ. For example, the three social channels defined for the non-DBand may include channel 1 (ch 1), channel 6 (ch 6) and channel 11 (ch 11), and the single social channel defined for the DBand may include channel 2 (ch 2).

As shown in FIG. 3, device 320 may listen (341) over channel 2 to receive a beacon from device 310.

As shown in FIG. 3, device 310 may transmit a probe request over each social channel of the three social channels of the 2.4 GHz band. For example, device 310 may transmit a probe request 324 over channel 1, a probe request 325 over channel 6, and a probe request 326 over channel 11.

As shown in FIG. 3, device 310 may transmit a plurality of beacons 327 in a plurality of directions over channel 2 of the DBand, for example, if device 310 did not receive any probe response, e.g., in response to probe requests 324, 325 and 326.

As shown in FIG. 3, device 320 may transmit a response 343 to device 310 utilizing a transmit sector sweep (SSW), e.g., in response to beacons 327.

As shown in FIG. 3, device 320 may transmit a feedback 328 to device 310, e.g., upon receiving a beacon of beacons 327. Device 310 may discover device 320 and may notify (329) an application 310 that device 320 is discovered.

As shown in FIG. 3, device 310 may transmit a probe request 330 to device 320, e.g., after discovery of device 320.

In some demonstrative embodiments, probe request 330 may include a unicast probe request.

In some demonstrative embodiments, device 320 may transmit an acknowledge (Ack) frame 344 to acknowledge receipt of the unicast probe request 330.

As shown in FIG. 3, device 320 may transmit a probe response 345 to device 310, e.g., in response to probe request 330.

As shown in FIG. 3, probe response 345 may include the delay value $T_{DELAY}$, representing the delay period between receiving probe request 330 from device 110 and transmitting Ack frame 344 by device 320, e.g., as described above.

In some demonstrative embodiments, controller 114 (FIG. 1) may estimate a distance between device 310 and device 320, for example, based on the delay value $T_{DELAY}$, e.g., as described.

As shown in FIG. 3, device 310 may notify (332) application 310 that device 320 is discovered and may provide application 320 information with respect to the position of device 310, e.g., the distance between device 310 and device 320.

Figure 4:
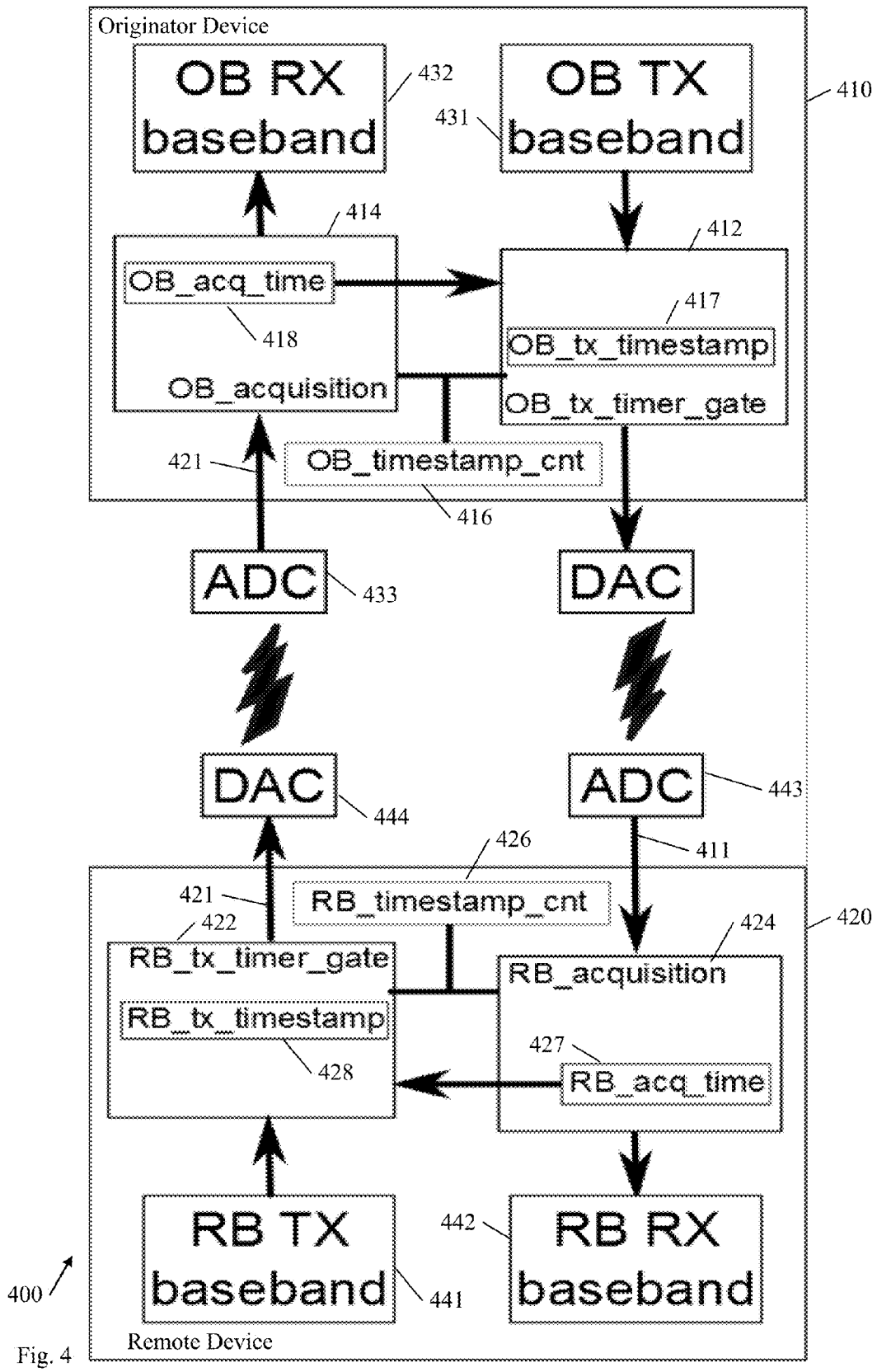
FIG. 4 is a schematic block diagram illustration of a system, in accordance with some demonstrative embodiments.

Reference is made to FIG. 4, which schematically illustrates a block diagram of a system 400, in accordance with some demonstrative embodiments.

In some demonstrative embodiments, system 400 may include an originator device 410 and a remote device 420. For example device 410 may perform the functionality of device 110 (FIG. 1) and device 420 may perform the functionality of device 120 (FIG. 1).

In some demonstrative embodiments, device 410 and device 420 may be configured to communicate over the WiGig frequency band.

In some demonstrative embodiments, device 410 and device 420 may communicate packets between device 410 and device 420.

In some demonstrative embodiments, device 410 and device 420 may include baseband processors to process received and transmitted packets. For example, device 410 may include an originator baseband (OB) transmit (TX) baseband 431 and an OB receive (RX) baseband 432, and device 420 may include a remote baseband (RB) TX baseband 441 and an RB RX baseband 442.

In some demonstrative embodiments, device 410 and device 420 may include analog to digital (ADC) and digital to analog converters (DAC) configured to convert between an analog signal and a digital signal and vice versa. For example, device 410 may include an ADC 433 and a DAC 434, and/or device 420 may include an ADC 443 and a DAC 444.

In some demonstrative embodiments, device 410 may send a Ping request (REQ) packet 411 to device 420.

In some demonstrative embodiments, device 410 may include an OB_tx_timer_gate block 412 including a counter 416 (OB_timestamp_cnt). For example, counter 416 may perform the functionality of counter 116 (FIG. 1).

In some demonstrative embodiments, counter 416 may include a 32-bit counter to be incremented at the symbol rate of ADC 433 and DAC 434, e.g., a symbol rate of 2640 Msps.

In some demonstrative embodiments, block 412 may capture a value of counter 416 in a register 417 (OB_tx_timestamp), e.g., the departure time of packet 411. For example, register 417 may perform the functionality of register 117 (FIG. 1).

In some demonstrative embodiments, device 420 may receive the Ping request packet 411 from device 410.

In some demonstrative embodiments, device 420 may include an RB_acquisition block 424 including a counter 426 (RB_timestamp_cnt). For example, counter 416 may perform the functionality of counter 116 (FIG. 1).

In some demonstrative embodiments, counter 426 may include a 32-bit counter to be incremented at the symbol rate of ADC 443 and DAC 444, e.g., a symbol rate of 2640 Msps.

In some demonstrative embodiments, block 424 may capture a value of counter 426 in a register 427 (RB_acq_time), e.g., the arrival time of packet 411 at device 420. For example, register 427 may perform the functionality of register 127 (FIG. 1).

In some demonstrative embodiments, counters 416 and 426 may not be synchronized. For example, a value of counter 416 may be different from the value of counter 426, for example, since a clock of RB 410 and a clock of OB 420 may not be synchronized.

In some demonstrative embodiments, device 420 may transmit a Ping acknowledge (ACK) packet 421 to device 410, to acknowledge the receipt of ping request packet 411, after the delay period $T_{DELAY}$ from the reception time captured in register 427.

In some demonstrative embodiments, device 420 may include an RB_tx_timer_gate block 422 including an RB_tx_timestamp register 428 to capture a value of counter 426. For example, register 428 may perform the functionality of register 128 (FIG. 1).

In some demonstrative embodiments, block 422 may enable transmission of ping packet 421 after the delay period $T_{DELAY}$ from receiving packet 411. For example, block 422 may transmit packet 421, e.g., when a difference between registers 428 and 427 corresponds to the delay period $T_{DELAY}$.

In some demonstrative embodiments, the delay period $T_{DELAY}$ may be relatively short based on processing time in RB RX baseband 441 and RB TX baseband 442.

In some demonstrative embodiments, device 410 may receive Ping ACK packet 421.

In some demonstrative embodiments, device 410 may include an OB_acquisition block 419 including a register 418 (OB_acq_time). For example, register 418 may perform the functionality of register 118 (FIG. 1).

In some demonstrative embodiments, block 419 may capture the value of counter 416 in register 418, e.g., the time of arrival of packet 421 at device 410.

In some demonstrative embodiments, device 410 may determine a round trip time between device 410 and device 420, e.g., as the difference between the values of counters 418 and 417, e.g., $T_{RTT}$=OB_acq_time−OB_tx_timestamp.

In some demonstrative embodiments, the predefined delay period of device 420 may be a preset value known to device 410 and node 420. In other embodiments, the predefined delay period of device 420 may be communicated at a later time, e.g., via a ping response (RES) packet transmitted from device 420 to device 410, e.g., as described above.

Figure 5:
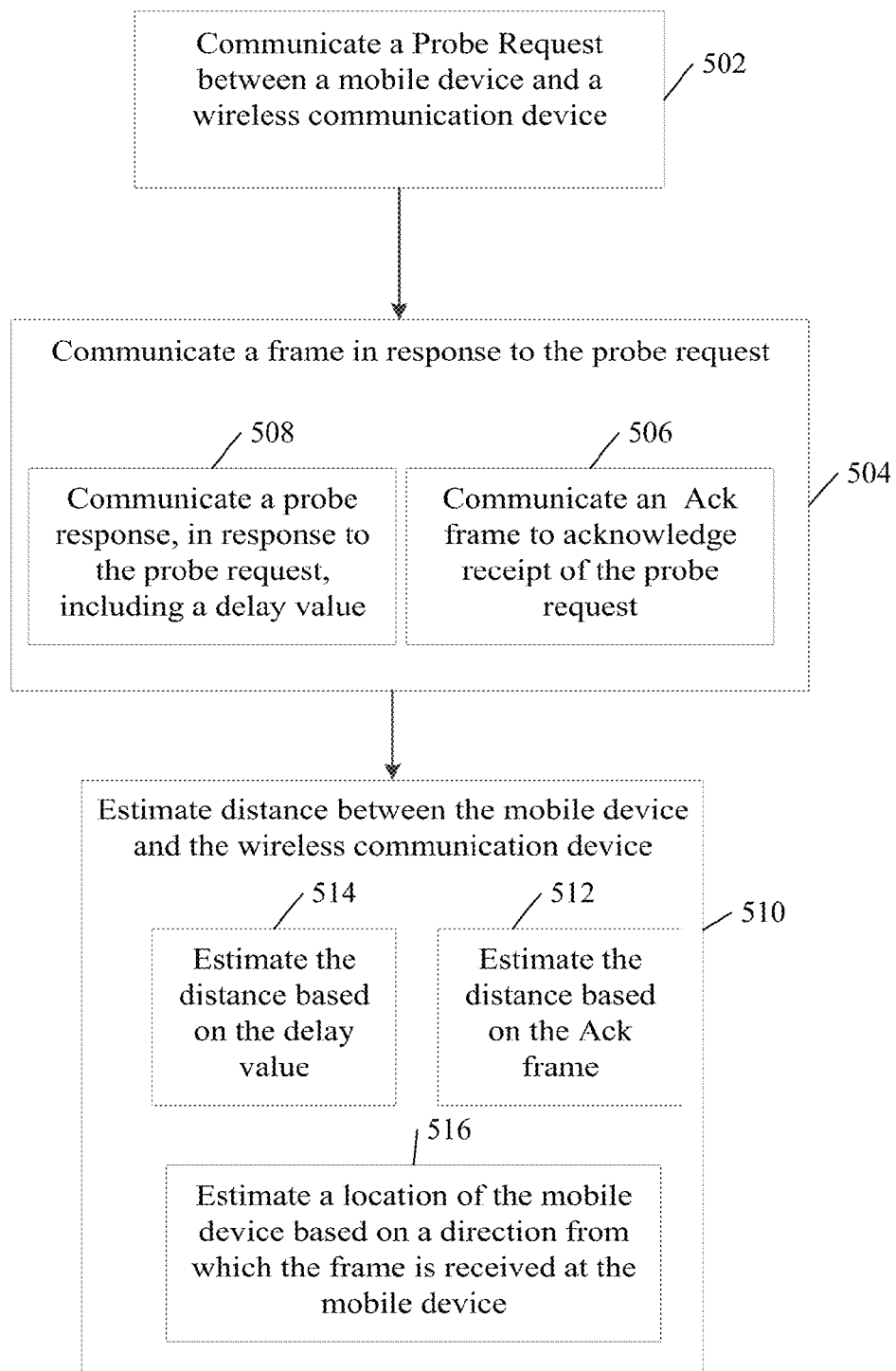
FIG. 5 is a schematic illustration of a method of estimating a location of a mobile device, in accordance with some demonstrative embodiments.

Reference is made to FIG. 5, which schematically illustrates a method of estimating a location of a mobile device, in accordance with some demonstrative embodiments. In some demonstrative embodiments, one or more of the operations of the method of FIG. 5 may be performed by any suitable wireless communication system, e.g., system 100

(FIG. 1), a mobile device, e.g., device 110 (FIG. 1), a wireless communication device, e.g., device 120 (FIG. 1), a controller, e.g., controllers 114 and 124 (FIG. 1), and/or a wireless communication unit, e.g., wireless communication units 112 and/or 122 (FIG. 1).

As indicated at block 502, the method may include communicating a probe request between a wireless communication device and a mobile device. For example, wireless communication units 112 and 122 (FIG. 1) may communicate the probe request, e.g., as described above.

As indicated at block 504, the method may include communicating a frame in response to the probe request between the wireless communication device and the mobile device. For example, wireless communication unit 112 and 122 (FIG. 1) may communicate the frame in response to the probe request, e.g., as described above.

As indicated at block 506, communicating the frame may include communicating an acknowledge (Ack) frame to acknowledge receipt of the probe request. For example, wireless communication unit 122 (FIG. 1) may transmit to device 110 (FIG. 1) the Ack frame to acknowledge receipt of the probe request, e.g., as described above.

As indicated at block 508, communicating the frame may include communicating a probe response in response to the probe request. The probe response may include a delay value representing a delay period between receiving the probe request and transmitting the frame by the device. For example, wireless communication unit 122 (FIG. 1) may transmit to device 110 (FIG. 1) the probe response including the delay value, e.g., as described above.

As indicated at block 510, the method may include estimating the distance between the wireless communication device and the mobile device. For example, controller 114 (FIG. 1) may estimate the distance between device 110 (FIG. 1) and device 120 (FIG. 1), e.g., as described above.

As indicated at block 512, estimating the distance between the wireless communication device and the mobile device may include estimating the distance based on the Ack frame. For example, controller 114 (FIG. 1) may estimate the distance between device 110 (FIG. 1) and device 120 (FIG. 1) based on the Ack frame, e.g., as described above.

As indicated at block 514, estimating the distance between the device and the mobile device may include estimating the distance based on the delay value. For example, controller 114 (FIG. 1) may estimate the distance between device 120 (FIG. 1) and device 120 (FIG. 1) based on the delay value, e.g., as described above.

As indicated at block 516, estimating the distance between the device and the mobile device may include estimating a location of the mobile device based on the direction from which the frame is received at the mobile device. For example, controller 114 (FIG. 1) may estimate a location of device 110 (FIG. 1) based on a direction from which the frame is received at mobile device 110 (FIG. 1), e.g., as described above.

Figure 6:
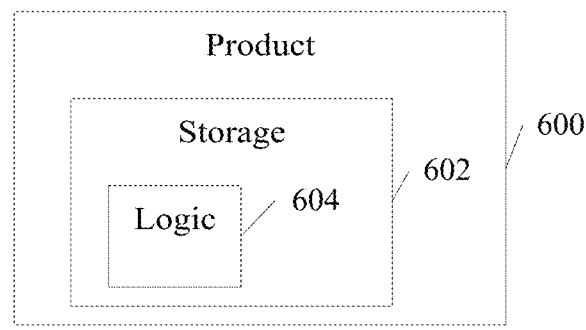
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 110 (FIG. 1), wireless communication unit 112 (FIG. 1), wireless communication unit 122 (FIG. 1), device 120 (FIG. 1), controller 114 (FIG. 1), controller 124 (FIG. 1), and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a controller to control a first wireless communication device to communicate a probe request with a second wireless communication device and to communicate a probe response with the second wireless communication device, wherein the probe response includes a delay value representing a delay period between a reception of the probe request and a transmission of a frame in response to the probe request.

Example 2 includes the subject matter of Example 1 and optionally, wherein the controller is to control the first wireless communication device to transmit the probe request to the second wireless communication device and to receive the probe response from the second wireless communication device.

Example 3 includes the subject matter of Example 2 and optionally, wherein the controller is to estimate a distance between the first and second wireless communication devices based on the frame.

Example 4 includes the subject matter of Example 2 or 3 and optionally, wherein the controller is to estimate a distance between the first and second wireless communication devices based on the delay value.

Example 5 includes the subject matter of any one of Examples 2-4 and optionally, wherein the controller is to determine a direction from which the probe response is received at the first wireless communication device, and wherein the controller is to estimate a location of the first wireless communication device based on the direction.

Example 6 includes the subject matter of any one of Examples 2-5 comprising a counter to be incremented at a symbol rate of the first wireless communication device; a first register to capture a first value of the counter at a transmission of the probe request; and a second register to capture a second value of the counter at a reception of the frame.

Example 7 includes the subject matter of Example 6 and optionally, wherein the controller is to estimate a distance between the first and second wireless communication devices based on a difference between the second value and the first value.

Example 8 includes the subject matter of any one of Examples 2-7 and optionally, wherein the first wireless communication device comprises a mobile device and wherein the second wireless communication device comprises a device selected from the group consisting of an access point (AP) and a wireless docking station.

Example 9 includes the subject matter of Example 1 and optionally, wherein the controller is to control the first wireless communication device to receive the probe request from the second wireless communication device and to transmit the frame to the second wireless communication device after the delay period.

Example 10 includes the subject matter of Example 9 comprising a counter to be incremented at a symbol rate of the first wireless communication device; a first register is to capture a first value of the counter at the reception of the probe request; and a second register is to capture a second value of the counter; wherein the controller is to control the first wireless communication device to transmit the frame when a difference between the first value and the second value corresponds to the delay period.

Example 11 includes the subject matter of Example 9 or 10 and optionally, wherein the first wireless communication device comprises a device selected from the group consisting of an access point (AP) and a wireless docking station, and wherein the second wireless communication device comprises a mobile device.

Example 12 includes the subject matter of any one of Examples 1-11 and optionally, wherein the controller is to control the first wireless communication device to communicate the probe request and the probe response over the mmWave wireless frequency band.

Example 13 includes the subject matter of any one of Examples 1-12 and optionally, wherein the controller is to control the first wireless communication device to communicate the probe request and the probe response for establishing a wireless communication link between the first and second wireless communication devices.

Example 14 includes the subject matter of any one of Examples 1-13 and optionally, wherein the probe request comprises a unicast probe request, and wherein the frame comprises an acknowledge (Ack) frame, to acknowledge receipt of the probe request.

Example 15 includes the subject matter of any one of Examples 1-14 and optionally, wherein the probe response includes the frame.

Example 16 includes the subject matter of any one of Examples 1-15 and optionally, wherein the controller is to control the first wireless communication device to communicate the probe request and the probe response over a wireless Gigabit (WiGig) frequency band.

Example 17 includes an apparatus of wireless communication, the apparatus comprising a controller to control a first wireless communication device to communicate a probe request with a second wireless communication device and to communicate a frame in response to the probe request, the controller is to estimate a distance between the first and second wireless communication devices based on the frame.

Example 18 includes the subject matter of Example 17 and optionally, wherein the controller is to control the first wireless communication device to transmit the probe request to the second wireless communication device and to receive the frame from the second wireless communication device.

Example 19 includes the subject matter of Example 18 and optionally, wherein the controller is to control the first wireless communication device to communicate a probe response in response to the probe request, and wherein the probe response includes a delay value representing a delay period between a reception of the probe request by the second wireless communication device and a transmission of the frame by the second wireless communication device.

Example 20 includes the subject matter of Example 19 and optionally, wherein the controller is to estimate the distance based on the delay value.

Example 21 includes the subject matter of any one of Examples 18-20 and optionally, wherein the controller is to determine a direction from which the frame is received at the first wireless communication device, and wherein the controller is to estimate a location of the first wireless communication device based on the direction.

Example 22 includes the subject matter of any one of Examples 17-21 and optionally, wherein the controller is to control the first wireless communication device to transmit a plurality of probe requests and to receive a plurality of frames in response to the plurality of probe requests, and wherein the controller is to estimate a delay time between the reception of the probe request by the second wireless communication device and the transmission of the frame by the second wireless communication device based on the plurality of probe requests and frames.

Example 23 includes the subject matter of Example 22 and optionally, wherein the controller is to control the first wireless communication device to transmit the plurality of probe requests and to receive the plurality of frames when the first wireless communication device is moving.

Example 24 includes the subject matter of any one of Examples 17-23 comprising a counter to be incremented at a symbol rate of the apparatus; a first register to capture a first value of the counter at a transmission of the probe request; and a second register to capture a second value of the counter at a reception of the frame.

Example 25 includes the subject matter of Example 24 and optionally, wherein the controller is to estimate the distance based on a difference between the second value and the first value.

Example 26 includes the subject matter of any one of Examples 17-25 and optionally, wherein the controller is to control the first wireless communication device to communicate the probe request and the frame over the mmWave wireless frequency band.

Example 27 includes the subject matter of any one of Examples 17-26 and optionally, wherein the probe request comprises a unicast probe request, and wherein the frame comprises an acknowledge (Ack) frame to acknowledge receipt of the unicast probe request.

Example 28 includes the subject matter of any one of Examples 17-27 and optionally, wherein the controller is to control the first wireless communication device to communicate the probe request and the frame over a wireless Gigabit (WiGig) frequency band.

Example 29 includes the subject matter of any one of Examples 17-28 and optionally, wherein the first wireless communication device comprises a mobile device, and wherein the second wireless communication device comprises a device selected from the group consisting of an access point (AP) and a wireless docking station.

Example 30 includes an apparatus of wireless communication, the apparatus comprising a controller to control a first wireless communication device to communicate a plurality of message sequences with a second wireless communication device, a message sequence of the plurality of message sequences including a first message transmitted from the first wireless communication device to the second wireless communication device and a second message transmitted from the second wireless communication device to the first wireless communication device in response to the first message, wherein the controller is to determine a delay time based on the plurality of message sequences, the delay time representing a delay period between a reception of the first message by the second wireless communication device and a transmission of the second message by the second wireless communication device.

Example 31 includes the subject matter of Example 30 and optionally, wherein the first message includes a probe request and the second message includes an acknowledge (Ack) frame or a probe response.

Example 32 includes the subject matter of Example 30 or 31 and optionally, wherein the controller is to estimate a distance between the first and second wireless communication devices based on the delay time.

Example 33 includes the subject matter of any one of Examples 30-32 and optionally, wherein the controller is to control the first wireless communication device to communicate a first message sequence and a second message sequence when the first wireless communication device is static.

Example 34 includes the subject matter of Example 33 and optionally, wherein a first time period between a reception of a first message of the first message sequence and a transmission of a second message of the first message sequence by the second wireless communication device is different from a second time period between a reception of a first message of the second message sequence and a transmission of a second message of the second sequence by the second wireless communication device.

Example 35 includes the subject matter of Example 34 and optionally, wherein the second time period is a multiple of the first time period, and wherein the controller is to estimate the time delay based on the first and second message sequences.

Example 36 includes the subject matter of any one of Examples 30-35 and optionally, wherein the controller is to control the first wireless communication device to communicate three message sequences when the first wireless communication device is moving.

Example 37 includes the subject matter of Example 36 and optionally, wherein the controller is to estimate the time delay based on the three message sequences.

Example 38 includes the subject matter of any one of Examples 30-37 and optionally, wherein the first wireless communication device comprises a mobile device and wherein the second wireless communication device comprises a device selected from the group consisting of an access point (AP) and a wireless docking station.

Example 39 includes the subject matter of any one of Examples 30-38 and optionally, wherein the controller is to control the first wireless communication device to communicate the first and second messages over the mmWave wireless frequency band.

Example 40 includes the subject matter of any one of Examples 30-39 and optionally, wherein the controller is to control the first wireless communication device to communicate the first and second messages over a wireless Gigabit (WiGig) frequency band.

Example 41 includes a system of wireless communication, the system comprising a first wireless communication device comprising an antenna; and a controller to control the first wireless communication device to communicate a probe request with a second wireless communication device and to communicate a probe response with the second wireless communication device, wherein the probe response includes a delay value representing a delay period between a reception of the probe request and a transmission of a frame in response to the probe request.

Example 42 includes the subject matter of Example 41 and optionally, wherein the controller is to control the first wireless communication device to transmit the probe request to the second wireless communication device and to receive the probe response from the second wireless communication device.

Example 43 includes the subject matter of Example 42 and optionally, wherein the controller is to estimate a distance between the first and second wireless communication devices based on the frame.

Example 44 includes the subject matter of Example 42 or 43 and optionally, wherein the controller is to estimate a distance between the first and second wireless communication devices based on the delay value.

Example 45 includes the subject matter of any one of Examples 42-44 and optionally, wherein the controller is to determine a direction from which the probe response is received at the first wireless communication device, and wherein the controller is to estimate a location of the first wireless communication device based on the direction.

Example 46 includes the subject matter of any one of Examples 42-45 comprising a counter to be incremented at a symbol rate of the first wireless communication device; a first register to capture a first value of the counter at a transmission of the probe request; and a second register to capture a second value of the counter at a reception of the frame.

Example 47 includes the subject matter of Example 46 and optionally, wherein the controller is to estimate a distance between the first and second wireless communication devices based on a difference between the second value and the first value.

Example 48 includes the subject matter of any one of Examples 42-47 and optionally, wherein the first wireless communication device comprises a mobile device and wherein the second wireless communication device comprises a device selected from the group consisting of an access point (AP) and a wireless docking station.

Example 49 includes the subject matter of Example 41 and optionally, wherein the controller is to control the first wireless communication device to receive the probe request from the second wireless communication device and to transmit the frame to the second wireless communication device after the delay period.

Example 50 includes the subject matter of Example 49 and optionally, wherein the first wireless communication device comprising a counter to be incremented at a symbol rate of the first wireless communication device; a first register is to capture a first value of the counter at the reception of the probe request; and a second register is to capture a second value of the counter; wherein the controller is to control the first wireless communication device to transmit the frame when a difference between the first value and the second value corresponds to the delay period.

Example 51 includes the subject matter of Example 49 or 50 and optionally, wherein the first wireless communication device comprises a device selected from the group consisting of an access point (AP) and a wireless docking station, and wherein the second wireless communication device comprises a mobile device.

Example 52 includes the subject matter of any one of Examples 41-51 and optionally, wherein the controller is to control the first wireless communication device to communicate the probe request and the probe response over the mmWave wireless frequency band.

Example 53 includes the subject matter of any one of Examples 41-52 and optionally, wherein the controller is to control the first wireless communication device to communicate the probe request and the probe response for establishing a wireless communication link between the first and second wireless communication devices.

Example 54 includes the subject matter of any one of Examples 41-53 and optionally, wherein the probe request comprises a unicast probe request, and wherein the frame comprises an acknowledge (Ack) frame, to acknowledge receipt of the probe request.

Example 55 includes the subject matter of any one of Examples 41-54 and optionally, wherein the probe response includes the frame.

Example 56 includes the subject matter of any one of Examples 41-55 and optionally, wherein the controller is to control the first wireless communication device to communicate the probe request and the probe response over a wireless Gigabit (WiGig) frequency band.

Example 57 includes a system of wireless communication, the system comprising a first wireless communication device comprising an antenna; and a controller to control the first wireless communication device to communicate a probe request with a second wireless communication device and to communicate a frame in response to the probe request, the controller is to estimate a distance between the first and second wireless communication devices based on the frame.

Example 58 includes the subject matter of Example 57 and optionally, wherein the controller is to control the first wireless communication device to transmit the probe request to the second wireless communication device and to receive the frame from the second wireless communication device.

Example 59 includes the subject matter of Example 58 and optionally, wherein the controller is to control the first wireless communication device to communicate a probe response in response to the probe request, and wherein the probe response includes a delay value representing a delay period between a reception of the probe request by the second wireless communication device and a transmission of the frame by the second wireless communication device.

Example 60 includes the subject matter of Example 59 and optionally, wherein the controller is to estimate the distance based on the delay value.

Example 61 includes the subject matter of any one of Examples 58-60 and optionally, wherein the controller is to determine a direction from which the frame is received at the first wireless communication device, and wherein the controller is to estimate a location of the first wireless communication device based on the direction.

Example 62 includes the subject matter of any one of Examples 57-61 and optionally, wherein the controller is to control the first wireless communication device to transmit a plurality of probe requests and to receive a plurality of frames in response to the plurality of probe requests, and wherein the controller is to estimate a delay time between a reception of the probe request by the second wireless communication device and a transmission of the frame by the second wireless communication device based on the plurality of probe requests and frames.

Example 63 includes the subject matter of Example 62 and optionally, wherein the controller is to control the first wireless communication device to transmit the plurality of probe requests and to receive the plurality of frames when the first wireless communication device is moving.

Example 64 includes the subject matter of any one of Examples 57-63 and optionally, wherein the first wireless communication device comprising a counter to be incremented at a symbol rate of the system; a first register to capture a first value of the counter at a transmission of the probe request; and a second register to capture a second value of the counter at a reception of the frame.

Example 65 includes the subject matter of Example 64 and optionally, wherein the controller is to estimate the distance based on a difference between the second value and the first value.

Example 66 includes the subject matter of any one of Examples 57-65 and optionally, wherein the controller is to control the first wireless communication device to communicate the probe request and the frame over the mmWave wireless frequency band.

Example 67 includes the subject matter of any one of Examples 57-66 and optionally, wherein the probe request comprises a unicast probe request, and wherein the frame comprises an acknowledge (Ack) frame to acknowledge receipt of the unicast probe request.

Example 68 includes the subject matter of any one of Examples 57-67 and optionally, wherein the controller is to control the first wireless communication device to communicate the probe request and the frame over a wireless Gigabit (WiGig) frequency band.

Example 69 includes the subject matter of any one of Examples 57-68 and optionally, wherein the first wireless communication device comprises a mobile device, and wherein the second wireless communication device comprises a device selected from the group consisting of an access point (AP) and a wireless docking station.

Example 70 includes a system of wireless communication, the system comprising a first wireless communication device comprising an antenna; and a controller to control the first wireless communication device to communicate a plurality of message sequences with a second wireless communication device, a message sequence of the plurality of message sequences including a first message transmitted from the first wireless communication device to the second wireless communication device and a second message transmitted from the second wireless communication device to the first wireless communication device in response to the first message, wherein the controller is to determine a delay time based on the plurality of message sequences, the delay time representing a delay period between a reception of the first message by the second wireless communication device and a transmission of the second message by the second wireless communication device.

Example 71 includes the subject matter of Example 70 and optionally, wherein the first message includes a probe request and the second message includes an acknowledge (Ack) frame or a probe response.

Example 72 includes the subject matter of Example 70 or 71 and optionally, wherein the controller is to estimate a distance between the first and second wireless communication devices based on the delay time.

Example 73 includes the subject matter of any one of Examples 70-72 and optionally, wherein the controller is to control the first wireless communication device to communicate a first message sequence and a second message sequence when the first wireless communication device is static.

Example 74 includes the subject matter of Example 73 and optionally, wherein a first time period between a reception of a first message of the first message sequence and a transmission of a second message of the first message sequence by the second wireless communication device is different from a second time period between a reception of a first message of the second message sequence and a transmission of a second message of the second sequence by the second wireless communication device.

Example 75 includes the subject matter of Example 74 and optionally, wherein the second time period is a multiple of the first time period, and wherein the controller is to estimate the time delay based on the first and second message sequences.

Example 76 includes the subject matter of any one of Examples 70-75 and optionally, wherein the controller is to control the first wireless communication device to communicate three message sequences when the first wireless communication device is moving.

Example 77 includes the subject matter of Example 76 and optionally, wherein the controller is to estimate the time delay based on the three message sequences.

Example 78 includes the subject matter of any one of Examples 70-77 and optionally, wherein the first wireless communication device comprises a mobile device and wherein the second wireless communication device comprises a device selected from the group consisting of an access point (AP) and a wireless docking station.

Example 79 includes the subject matter of any one of Examples 70-78 and optionally, wherein the controller is to control the first wireless communication device to communicate the first and second messages over the mmWave wireless frequency band.

Example 80 includes the subject matter of any one of Examples 70-79 and optionally, wherein the controller is to control the first wireless communication device to communicate the first and second messages over a wireless Gigabit (WiGig) frequency band.

Example 81 includes a method of wireless communication, the method comprising communicating a probe request between a first wireless communication device and a second wireless communication device; and communicating a probe response between the second wireless communication device and the first wireless communication device, the probe response includes a delay value representing a delay period between a reception of the probe request and a transmission of a frame in response to the probe request.

Example 82 includes the subject matter of Example 81 comprising transmitting the probe request to the second wireless communication device and receiving the probe response from the second wireless communication device.

Example 83 includes the subject matter of Example 82 comprising estimating a distance between the first and second wireless communication devices based on the frame.

Example 84 includes the subject matter of Example 82 or 83 comprising estimating a distance between the first and second wireless communication devices based on the delay value.

Example 85 includes the subject matter of any one of Examples 82-84 comprising determining a direction from which the probe response is received at the first wireless communication device; and estimating a location of the first wireless communication device based on the direction.

Example 86 includes the subject matter of any one of Examples 82-85 comprising incrementing a counter at a symbol rate of the first wireless communication device; capturing a first value of the counter at a transmission of the probe request; and capturing a second value of the counter at a reception of the frame.

Example 87 includes the subject matter of Example 86 comprising estimating a distance between the first and second wireless communication devices based on a difference between the second value and the first value.

Example 88 includes the subject matter of any one of Examples 82-87 and optionally, wherein the first wireless communication device comprises a mobile device and wherein the second wireless communication device comprises a device selected from the group consisting of an access point (AP) and a wireless docking station.

Example 89 includes the subject matter of Example 81 comprising receiving the probe request from the second wireless communication device and transmitting the frame to the second wireless communication device after the delay period.

Example 90 includes the subject matter of Example 89 comprising incrementing a counter at a symbol rate of the first wireless communication device; capturing a first value of the counter at the reception of the probe request; capturing a second value of the counter; and transmitting the frame when a difference between the first value and the second value corresponds to the delay period.

Example 91 includes the subject matter of Example 89 or 90 and optionally, wherein the first wireless communication device comprises a device selected from the group consisting of an access point (AP) and a wireless docking station, and wherein the second wireless communication device comprises a mobile device.

Example 92 includes the subject matter of any one of Examples 81-91 comprising communicating the probe request and the probe response over the mmWave wireless frequency band.

Example 93 includes the subject matter of any one of Examples 81-92 comprising communicating the probe request and the probe response for establishing a wireless communication link between the first and second wireless communication devices.

Example 94 includes the subject matter of any one of Examples 81-93 and optionally, wherein the probe request comprises a unicast probe request, and wherein the frame comprises an acknowledge (Ack) frame, to acknowledge receipt of the probe request.

Example 95 includes the subject matter of any one of Examples 81-94 and optionally, wherein the probe response includes the frame.

Example 96 includes the subject matter of any one of Examples 81-95 comprising communicating the probe request and the probe response over a wireless Gigabit (WiGig) frequency band.

Example 97 includes a method of wireless communication, the method comprising communicating a probe request between a first wireless communication device and a second wireless communication device; communicating a frame in response to the probe request; and estimating a distance between the first and second wireless communication devices based on the frame.

Example 98 includes the subject matter of Example 97 comprising transmitting the probe request to the second wireless communication device and receiving the frame from the second wireless communication device.

Example 99 includes the subject matter of Example 98 comprising communicating a probe response in response to the probe request, and wherein the probe response includes a delay value representing a delay period between a reception of the probe request by the second wireless communication device and a transmission of the frame by the second wireless communication device.

Example 100 includes the subject matter of Example 99 comprising estimating the distance based on the delay value.

Example 101 includes the subject matter of any one of Examples 98-100 comprising determining a direction from which the frame is received at the first wireless communication device; and estimating a location of the first wireless communication device based on the direction.

Example 102 includes the subject matter of any one of Examples 97-111 comprising transmitting a plurality of probe requests and receiving a plurality of frames in response to the plurality of probe requests; and estimating a delay time between a reception of the probe request by the second wireless communication device and a transmission of the frame by the second wireless communication device based on the plurality of probe requests and frames.

Example 103 includes the subject matter of Example 102 comprising transmitting the plurality of probe requests and receiving the plurality of frames when the first wireless communication device is moving.

Example 104 includes the subject matter of any one of Examples 97-103 comprising incrementing a counter at a symbol rate of the first wireless communication device; capturing a first value of the counter at a transmission of the probe request; and capturing a second value of the counter at a reception of the frame.

Example 105 includes the subject matter of Example 104 comprising estimating the distance based on a difference between the second value and the first value.

Example 106 includes the subject matter of any one of Examples 97-105 comprising communicating the probe request and the frame over the mmWave wireless frequency band.

Example 107 includes the subject matter of any one of Examples 97-106 and optionally, wherein the probe request comprises a unicast probe request, and wherein the frame comprises an acknowledge (Ack) frame to acknowledge receipt of the unicast probe request.

Example 108 includes the subject matter of any one of Examples 97-107 comprising communicating the probe request and the frame over a wireless Gigabit (WiGig) frequency band.

Example 109 includes the subject matter of any one of Examples 97-108 and optionally, wherein the first wireless communication device comprises a mobile device, and wherein the second wireless communication device comprises a device selected from the group consisting of an access point (AP) and a wireless docking station.

Example 110 includes a method of wireless communication, the method comprising communicating a plurality of message sequences between a first wireless communication device and a second wireless communication device, a message sequence of the plurality of message sequences including a first message transmitted from the first wireless communication device to the second wireless communication device and a second message transmitted from the second wireless communication device to the first wireless communication device in response to the first message; and determining a delay time based on the plurality of message sequences, the delay time representing a delay period between a reception of the first message by the second wireless communication device and a transmission of the second message by the second wireless communication device.

Example 111 includes the subject matter of Example 110 and optionally, wherein the first message includes a probe request and the second message includes an acknowledge (Ack) frame or a probe response.

Example 112 includes the subject matter of Example 110 or 111 comprising estimating a distance between the first and second wireless communication devices based on the delay time.

Example 113 includes the subject matter of any one of Examples 110-112 comprising communicating a first message sequence and a second message sequence when the first wireless communication device is static.

Example 114 includes the subject matter of Example 113 and optionally, wherein a first time period between a reception of a first message of the first message sequence and a transmission of a second message of the first message sequence by the second wireless communication device is different from a second time period between a reception of a first message of the second message sequence and a transmission of a second message of the second sequence by the second wireless communication device.

Example 115 includes the subject matter of Example 114 and optionally, wherein the second time period is a multiple of the first time period, and wherein the controller is to estimate the time delay based on the first and second message sequences.

Example 116 includes the subject matter of any one of Examples 110-115 comprising communicating three message sequences when the first wireless communication device is moving.

Example 117 includes the subject matter of Example 116 comprising estimating the time delay based on the three message sequences.

Example 118 includes the subject matter of any one of Examples 110-117 and optionally, wherein the first wireless communication device comprises a mobile device and wherein the second wireless communication device comprises a device selected from the group consisting of an access point (AP) and a wireless docking station.

Example 119 includes the subject matter of any one of Examples 110-118 comprising communicating the first and second messages over the mmWave wireless frequency band.

Example 120 includes the subject matter of any one of Examples 110-119 comprising communicating the first and second messages over a wireless Gigabit (WiGig) frequency band.

Example 121 includes a product including a non-transitory storage medium having stored thereon instructions that, when executed by a machine, result in communicating a probe request between a first wireless communication device and a second wireless communication device; and communicating a probe response between the second wireless communication device and the first wireless communication device, the probe response includes a delay value representing a delay period between a reception of the probe request and a transmission of a frame in response to the probe request.

Example 122 includes the subject matter of Example 121 and optionally, wherein the instructions result in transmitting the probe request to the second wireless communication device and receiving the probe response from the second wireless communication device.

Example 123 includes the subject matter of Example 122 and optionally, wherein the instructions result in estimating a distance between the first and second wireless communication devices based on the frame.

Example 124 includes the subject matter of Example 122 or 123 and optionally, wherein the instructions result in estimating a distance between the first and second wireless communication devices based on the delay value.

Example 125 includes the subject matter of any one of Examples 122-124 and optionally, wherein the instructions result in determining a direction from which the probe response is received at the first wireless communication device; and estimating a location of the first wireless communication device based on the direction.

Example 126 includes the subject matter of any one of Examples 122-125 and optionally, wherein the instructions result in incrementing a counter at a symbol rate of the first wireless communication device; capturing a first value of the counter at a transmission of the probe request; and capturing a second value of the counter at a reception of the frame.

Example 127 includes the subject matter of Example 126 and optionally, wherein the instructions result in estimating a distance between the first and second wireless communication devices based on a difference between the second value and the first value.

Example 128 includes the subject matter of any one of Examples 122-127 and optionally, wherein the first wireless communication device comprises a mobile device and wherein the second wireless communication device comprises a device selected from the group consisting of an access point (AP) and a wireless docking station.

Example 129 includes the subject matter of Example 121 and optionally, wherein the instructions result in receiving the probe request from the second wireless communication device and transmitting the frame to the second wireless communication device after the delay period.

Example 130 includes the subject matter of Example 129 and optionally, wherein the instructions result in incrementing a counter at a symbol rate of the first wireless communication device; capturing a first value of the counter at the reception of the probe request; capturing a second value of the counter; and transmitting the frame when a difference between the first value and the second value corresponds to the delay period.

Example 131 includes the subject matter of Example 129 or 130 and optionally, wherein the first wireless communication device comprises a device selected from the group consisting of an access point (AP) and a wireless docking station, and wherein the second wireless communication device comprises a mobile device.

Example 132 includes the subject matter of any one of Examples 121-131 and optionally, wherein the instructions result in communicating the probe request and the probe response over the mmWave wireless frequency band.

Example 133 includes the subject matter of any one of Examples 121-132 and optionally, wherein the instructions result in communicating the probe request and the probe response for establishing a wireless communication link between the first and second wireless communication devices.

Example 134 includes the subject matter of any one of Examples 121-133 and optionally, wherein the probe request comprises a unicast probe request, and wherein the frame comprises an acknowledge (Ack) frame, to acknowledge receipt of the probe request.

Example 135 includes the subject matter of any one of Examples 121-134 and optionally, wherein the probe response includes the frame.

Example 136 includes the subject matter of any one of Examples 121-135 and optionally, wherein the instructions result in communicating the probe request and the probe response over a wireless Gigabit (WiGig) frequency band.

Example 137 includes a product including a non-transitory storage medium having stored thereon instructions that, when executed by a machine, result in communicating a probe request between a first wireless communication device and a second wireless communication device; communicating a frame in response to the probe request; and estimating a distance between the first and second wireless communication devices based on the frame.

Example 138 includes the subject matter of Example 137 and optionally, wherein the instructions result in transmitting the probe request to the second wireless communication device and receiving the frame from the second wireless communication device.

Example 139 includes the subject matter of Example 138 and optionally, wherein the instructions result in communicating a probe response in response to the probe request, and wherein the probe response includes a delay value representing a delay period between a reception of the probe request by the second wireless communication device and a transmission of the frame by the second wireless communication device.

Example 140 includes the subject matter of Example 139 and optionally, wherein the instructions result in estimating the distance based on the delay value.

Example 141 includes the subject matter of any one of Examples 138-140 and optionally, wherein the instructions result in determining a direction from which the frame is received at the first wireless communication device; and estimating a location of the first wireless communication device based on the direction.

Example 142 includes the subject matter of any one of Examples 137-141 and optionally, wherein the instructions result in transmitting a plurality of probe requests and receiving a plurality of frames in response to the plurality of probe requests; and estimating a delay time between a reception of the probe request by the second wireless communication device and a transmission of the frame by the second wireless communication device based on the plurality of probe requests and frames.

Example 143 includes the subject matter of Example 142 and optionally, wherein the instructions result in transmitting the plurality of probe requests and receiving the plurality of frames when the first wireless communication device is moving.

Example 144 includes the subject matter of any one of Examples 137-143 and optionally, wherein the instructions result in incrementing a counter at a symbol rate of the first wireless communication device; capturing a first value of the counter at a transmission of the probe request; and capturing a second value of the counter at a reception of the frame.

Example 145 includes the subject matter of Example 144 and optionally, wherein the instructions result in estimating the distance based on a difference between the second value and the first value.

Example 146 includes the subject matter of any one of Examples 137-145 and optionally, wherein the instructions result in communicating the probe request and the frame over the mmWave wireless frequency band.

Example 147 includes the subject matter of any one of Examples 137-146 and optionally, wherein the probe request comprises a unicast probe request, and wherein the frame comprises an acknowledge (Ack) frame to acknowledge receipt of the unicast probe request.

Example 148 includes the subject matter of any one of Examples 137-147 and optionally, wherein the instructions result in communicating the probe request and the frame over a wireless Gigabit (WiGig) frequency band.

Example 149 includes the subject matter of any one of Examples 137-148 and optionally, wherein the first wireless communication device comprises a mobile device, and wherein the second wireless communication device comprises a device selected from the group consisting of an access point (AP) and a wireless docking station.

Example 150 includes a product including a non-transitory storage medium having stored thereon instructions that, when executed by a machine, result in communicating a plurality of message sequences with a second wireless communication device, a message sequence of the plurality of message sequences including a first message transmitted from the first wireless communication device to the second wireless communication device and a second message transmitted from the second wireless communication device to the first wireless communication device in response to the first message; and determining a delay time based on the plurality of message sequences, the delay time representing a delay period between a reception of the first message by the second wireless communication device and a transmission of the second message by the second wireless communication device.

Example 151 includes the subject matter of Example 150 and optionally, wherein the first message includes a probe request and the second message includes an acknowledge (Ack) frame or a probe response.

Example 152 includes the subject matter of Example 150 or 151 and optionally, wherein the instructions result in estimating a distance between the first and second wireless communication devices based on the delay time.

Example 153 includes the subject matter of any one of Examples 150-152 and optionally, wherein the instructions result in communicating a first message sequence and a second message sequence when the first wireless communication device is static.

Example 154 includes the subject matter of Example 153 and optionally, wherein a first time period between a reception of a first message of the first message sequence and a transmission of a second message of the first message sequence by the second wireless communication device is different from a second time period between a reception of a first message of the second message sequence and a transmission of a second message of the second sequence by the second wireless communication device.

Example 155 includes the subject matter of Example 154 and optionally, wherein the second time period is a multiple of the first time period, and wherein the controller is to estimate the time delay based on the first and second message sequences.

Example 156 includes the subject matter of any one of Examples 150-155 and optionally, wherein the instructions result in communicating three message sequences when the first wireless communication device is moving.

Example 157 includes the subject matter of Example 156 and optionally, wherein the instructions result in estimating the time delay based on the three message sequences.

Example 158 includes the subject matter of any one of Examples 150-157 and optionally, wherein the first wireless communication device comprises a mobile device and wherein the second wireless communication device comprises a device selected from the group consisting of an access point (AP) and a wireless docking station.

Example 159 includes the subject matter of any one of Examples 150-158 and optionally, wherein the instructions result in communicating the first and second messages over the mmWave wireless frequency band.

Example 160 includes the subject matter of any one of Examples 150-159 and optionally, wherein the instructions result in communicating the first and second messages over a wireless Gigabit (WiGig) frequency band.

Example 161 includes an apparatus of wireless communication, the apparatus comprising means for communicating a probe request between a first wireless communication device and a second wireless communication device; and means for communicating a probe response between the second wireless communication device and the first wireless communication device, the probe response includes a delay value representing a delay period between a reception of the probe request and a transmission of a frame in response to the probe request.

Example 162 includes the subject matter of Example 161 comprising means for transmitting the probe request to the second wireless communication device and receiving the probe response from the second wireless communication device.

Example 163 includes the subject matter of Example 162 comprising means for estimating a distance between the first and second wireless communication devices based on the frame.

Example 164 includes the subject matter of Example 162 or 163 comprising means for estimating a distance between the first and second wireless communication devices based on the delay value.

Example 165 includes the subject matter of any one of Examples 162-164 comprising means for determining a direction from which the probe response is received at the first wireless communication device; and means for estimating a location of the first wireless communication device based on the direction.

Example 166 includes the subject matter of any one of Examples 162-165 comprising means for incrementing a counter at a symbol rate of the first wireless communication device; means for capturing a first value of the counter at a transmission of the probe request; and means for capturing a second value of the counter at a reception of the frame.

Example 167 includes the subject matter of Example 166 comprising means for estimating a distance between the first and second wireless communication devices based on a difference between the second value and the first value.

Example 168 includes the subject matter of any one of Examples 162-167 and optionally, wherein the first wireless communication device comprises a mobile device and wherein the second wireless communication device comprises a device selected from the group consisting of an access point (AP) and a wireless docking station.

Example 169 includes the subject matter of Example 161 comprising means for receiving the probe request from the second wireless communication device and transmitting the frame to the second wireless communication device after the delay period.

Example 170 includes the subject matter of Example 169 comprising means for incrementing a counter at a symbol rate of the first wireless communication device; means for capturing a first value of the counter at the reception of the probe request; means for capturing a second value of the counter; and means for transmitting the frame when a difference between the first value and the second value corresponds to the delay period.

Example 171 includes the subject matter of Example 169 or 170 and optionally, wherein the first wireless communication device comprises a device selected from the group consisting of an access point (AP) and a wireless docking station, and wherein the second wireless communication device comprises a mobile device.

Example 172 includes the subject matter of any one of Examples 161-171 comprising means for communicating the probe request and the probe response over the mmWave wireless frequency band.

Example 173 includes the subject matter of any one of Examples 161-172 comprising means for communicating the probe request and the probe response for establishing a wireless communication link between the first and second wireless communication devices.

Example 174 includes the subject matter of any one of Examples 161-173 and optionally, wherein the probe request comprises a unicast probe request, and wherein the frame comprises an acknowledge (Ack) frame, to acknowledge receipt of the probe request.

Example 175 includes the subject matter of any one of Examples 161-174 and optionally, wherein the probe response includes the frame.

Example 176 includes the subject matter of any one of Examples 161-175 comprising means for communicating the probe request and the probe response over a wireless Gigabit (WiGig) frequency band.

Example 177 includes an apparatus of wireless communication, the apparatus comprising means for communicating a probe request between a first wireless communication device and a second wireless communication device; means for communicating a frame in response to the probe request; and means for estimating a distance between the first and second wireless communication devices based on the frame.

Example 178 includes the subject matter of Example 177 comprising means for transmitting the probe request to the second wireless communication device and receiving the frame from the second wireless communication device.

Example 179 includes the subject matter of Example 178 comprising means for communicating a probe response in response to the probe request, and wherein the probe response includes a delay value representing a delay period between a reception of the probe request by the second wireless communication device and a transmission of the frame by the second wireless communication device.

Example 180 includes the subject matter of Example 179 comprising means for estimating the distance based on the delay value.

Example 181 includes the subject matter of any one of Examples 178-180 comprising means for determining a direction from which the frame is received at the first wireless communication device; and estimating a location of the first wireless communication device based on the direction.

Example 182 includes the subject matter of any one of Examples 177-181 comprising means for transmitting a plurality of probe requests and receiving a plurality of frames in response to the plurality of probe requests; and estimating a delay time between a reception of the probe request by the second wireless communication device and a transmission of the frame by the second wireless communication device based on the plurality of probe requests and frames.

Example 183 includes the subject matter of Example 182 comprising means for transmitting the plurality of probe requests and receiving the plurality of frames when the first wireless communication device is moving.

Example 184 includes the subject matter of any one of Examples 177-183 comprising means for incrementing a counter at a symbol rate of the first wireless communication device; means for capturing a first value of the counter at a transmission of the probe request; and means for capturing a second value of the counter at a reception of the frame.

Example 185 includes the subject matter of Example 184 comprising means for estimating the distance based on a difference between the second value and the first value.

Example 186 includes the subject matter of any one of Examples 177-185 comprising means for communicating the probe request and the frame over the mmWave wireless frequency band.

Example 187 includes the subject matter of any one of Examples 177-186 and optionally, wherein the probe request comprises a unicast probe request, and wherein the frame comprises an acknowledge (Ack) frame to acknowledge receipt of the unicast probe request.

Example 188 includes the subject matter of any one of Examples 177-187 comprising means for communicating the probe request and the frame over a wireless Gigabit (WiGig) frequency band.

Example 189 includes the subject matter of any one of Examples 177-188 and optionally, wherein the first wireless communication device comprises a mobile device, and wherein the second wireless communication device comprises a device selected from the group consisting of an access point (AP) and a wireless docking station.

Example 190 includes an apparatus of wireless communication, the apparatus comprising means for communicating a plurality of message sequences with a second wireless communication device, a message sequence of the plurality of message sequences including a first message transmitted from the first wireless communication device to the second wireless communication device and a second message transmitted from the second wireless communication device to the first wireless communication device in response to the first message; and means for determining a delay time based on the plurality of message sequences, the delay time representing a delay period between a reception of the first message by the second wireless communication device and a transmission of the second message by the second wireless communication device.

Example 191 includes the subject matter of Example 190 and optionally, wherein the first message includes a probe request and the second message includes an acknowledge (Ack) frame or a probe response.

Example 192 includes the subject matter of Example 190 or 191 comprising means for estimating a distance between the first and second wireless communication devices based on the delay time.

Example 193 includes the subject matter of any one of Examples 190-192 comprising means for communicating a first message sequence and a second message sequence when the first wireless communication device is static.

Example 194 includes the subject matter of Example 193 and optionally, wherein a first time period between a reception of a first message of the first message sequence and a transmission of a second message of the first message sequence by the second wireless communication device is different from a second time period between a reception of a first message of the second message sequence and a transmission of a second message of the second sequence by the second wireless communication device.

Example 195 includes the subject matter of Example 194 and optionally, wherein the second time period is a multiple of the first time period, and wherein the controller is to estimate the time delay based on the first and second message sequences.

Example 196 includes the subject matter of any one of Examples 190-195 comprising means for communicating three message sequences when the first wireless communication device is moving.

Example 197 includes the subject matter of Example 196 comprising means for estimating the time delay based on the three message sequences.

Example 198 includes the subject matter of any one of Examples 190-197 and optionally, wherein the first wireless communication device comprises a mobile device and wherein the second wireless communication device comprises a device selected from the group consisting of an access point (AP) and a wireless docking station.

Example 199 includes the subject matter of any one of Examples 190-198 comprising means for communicating the first and second messages over the mmWave wireless frequency band.

Example 200 includes the subject matter of any one of Examples 190-199 comprising means for communicating the first and second messages over a wireless Gigabit (WiGig) frequency band.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a counter to be incremented at a symbol rate of a first wireless communication device;
   a first register;
   a second register; and
   a controller to cause said first wireless communication device to communicate a probe request with a second wireless communication device and to communicate a probe response with said second wireless communication device, wherein said probe response includes a delay value representing a delay period between a reception of said probe request and a transmission of a frame in response to said probe request, said first register to capture a first value of said counter at reception of the probe request by the first wireless communication device, said second register is to capture a second value of said counter, said controller is configured to enable transmission of the frame when a difference between the second value in the second register and the first value in the first register represents the delay period according to the symbol rate.

2. The apparatus of claim 1, wherein said controller is to cause said first wireless communication device to receive said probe request from said second wireless communication device and to transmit said frame to said second wireless communication device after said delay period.

3. The apparatus of claim 1, wherein said first wireless communication device comprises a device selected from the group consisting of an access point (AP) and a wireless docking station, and wherein said second wireless communication device comprises a mobile device.

4. The apparatus of claim 1, wherein said controller is to cause said first wireless communication device to communicate said probe request and said probe response over a millimeter-wave (mmWave) wireless frequency band.

5. The apparatus of claim 1, wherein said controller is to cause said first wireless communication device to communicate said probe request and said probe response for establishing a wireless communication link between the first and second wireless communication devices.

6. The apparatus of claim 1, wherein said probe request comprises a unicast probe request, and wherein said frame comprises an acknowledge (Ack) frame, to acknowledge receipt of said probe request.

7. The apparatus of claim 1, wherein said probe response includes said frame.

8. The apparatus of claim 1, wherein said controller is to cause said first wireless communication device to communicate said probe request and said probe response over a wireless Gigabit (WiGig) frequency band.

9. A system comprising:
   a first wireless communication device comprising:
   an antenna; and
   a controller to cause the first wireless communication device to communicate a plurality of message sequences with a second wireless communication device, a message sequence of said plurality of message sequences including a first message transmitted from the first wireless communication device to the second wireless communication device and a second message from the second wireless communication device to the first wireless communication device in response to the first message, wherein said controller is to determine a delay time based on said plurality of message sequences, said delay time representing a delay period between a reception of said first message by said second wireless communication device and a transmission of said second message by said second wireless communication device, said controller is configured to determine the delay time based on at least a first round trip time and a second round trip time measured at the first wireless communication device, the first round trip time comprising a round trip time of a first message sequence, and the second round trip time comprising a round trip time of a second message sequence, said first round trip time comprising a first delay period between a reception of a first message of the first message sequence by said second wireless communication device and a transmission of a second message of the first message sequence from said second wireless communication device, the second round trip time comprising a second delay period between a reception of a first message of the second message sequence by said second wireless communication device and a transmission of a second message of the second message sequence from said second wireless communication device, said second delay period is different from, and an integer multiple of, the first delay period.

10. The system of claim 9, wherein said first message transmitted from the first wireless communication device includes a probe request and said second message from the second wireless communication device includes an acknowledge (Ack) frame or a probe response.

11. The system of claim 9, wherein said controller is to estimate a distance between said first and second wireless communication devices based on the delay time.

12. The system of claim 9, wherein said controller is to cause said first wireless communication device to communicate three message sequences when said first wireless communication device is moving, and to determine the delay period based on the first round trip time, the second round trip time, and a third round trip time measured at the first wireless communication device, the third round trip time comprising a round trip time of a third message sequence.

13. A method to be performed at a first wireless communication device, the method comprising:
communicating a plurality of message sequences with a second wireless communication device, a message sequence of said plurality of message sequences including a first message transmitted from the first wireless communication device to the second wireless communication device and a second message from the second wireless communication device to the first wireless communication device in response to the first message; and
determining a delay time based on said plurality of message sequences, said delay time representing a delay period between a reception of said first message by said second wireless communication device and a transmission of said second message by said second wireless communication device,
wherein determining the delay time is based on at least a first round trip time and a second round trip time measured at the first wireless communication device, the first round trip time comprising a round trip time of a first message sequence, and the second round trip time comprising a round trip time of a second message sequence, said first round trip time comprising a first delay period between a reception of a first message of the first message sequence by said second wireless communication device and a transmission of a second message of the first message sequence from said second wireless communication device, the second round trip time comprising a second delay period between a reception of a first message of the second message sequence by said second wireless communication device and a transmission of a second message of the second message sequence from said second wireless communication device, said second delay period is different from, and an integer multiple of, the first delay period.

14. The method of claim 13, wherein said first message transmitted from the first wireless communication device includes a probe request and said second message from the second wireless communication device includes an acknowledge (Ack) frame or a probe response.

15. The method of claim 13 comprising communicating said plurality of message sequences over a millimeter-wave (mmWave) wireless frequency band.

16. A product including a non-transitory storage medium having stored thereon instructions that, when executed by a machine, cause a first wireless communication device to:
communicate a plurality of message sequences with a second wireless communication device, a message sequence of said plurality of message sequences including a first message transmitted from the first wireless communication device to the second wireless communication device and a second message from the second wireless communication device to the first wireless communication device in response to the first message; and
determine a delay time based on said plurality of message sequences, said delay time representing a delay period between a reception of said first message by said second wireless communication device and a transmission of said second message by said second wireless communication device,
wherein the instructions, when executed, cause the first wireless communication device to determine the delay time based on at least a first round trip time and a second round trip time measured at the first wireless communication device, the first round trip time comprising a round trip time of a first message sequence, and the second round trip time comprising a round trip time of a second message sequence, said first round trip time comprising a first delay period between a reception of a first message of the first message sequence by said second wireless communication device and a transmission of a second message of the first message sequence from said second wireless communication device, the second round trip time comprising a second delay period between a reception of a first message of the second message sequence by said second wireless communication device and a transmission of a second message of the second message sequence from said second wireless communication device, said second delay period is different from, and an integer multiple of, the first delay period.

17. The product of claim 16, wherein the instructions, when executed, cause the first wireless communication device to communicate three message sequences when said first wireless communication device is moving, and to determine the delay period based on the first round trip time, the second round trip time and a third round trip time measured at the first wireless communication device, the third round trip time comprising a round trip time of a third message sequence.

18. The product of claim 16, wherein said instructions, when executed, cause the first wireless communication device to communicate said plurality of message sequences over a millimeter-wave (mmWave) wireless frequency band.

19. The product of claim 16, wherein said first message transmitted from the first wireless communication device includes a probe request and said second message from the second wireless communication device includes an acknowledge (Ack) frame or a probe response.

* * * * *